(12) United States Patent
McGeer et al.

(10) Patent No.: US 8,672,264 B1
(45) Date of Patent: *Mar. 18, 2014

(54) METHOD AND APPARATUS FOR RETRIEVING A HOVERING AIRCRAFT

(71) Applicant: Aerovel Corporation, White Salmon, WA (US)

(72) Inventors: Brian T. McGeer, Underwood, WA (US); Andreas H. Von Flotow, Hood River, OR (US); Corydon C. Roeseler, Hood River, OR (US)

(73) Assignee: Aerovel Corporation, White Salmon, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,147

(22) Filed: Dec. 17, 2012

Related U.S. Application Data

(60) Continuation of application No. 13/540,032, filed on Jul. 2, 2012, now Pat. No. 8,348,193, which is a continuation of application No. 13/024,843, filed on Feb. 10, 2011, now Pat. No. 8,245,968, which is a division of application No. 11/837,878, filed on Aug. 13, 2007, now Pat. No. 7,954,758.

(60) Provisional application No. 60/823,442, filed on Aug. 24, 2006.

(51) Int. Cl.
*B64F 1/02* (2006.01)
*B64F 1/04* (2006.01)

(52) U.S. Cl.
USPC .. 244/110 C; 244/63; 244/110 R; 244/110 F; 244/110 G

(58) Field of Classification Search
USPC .............. 244/110 C, 110 F, 110 G, 114 R, 63
See application file for complete search history.

(56) References Cited

U.S. PATENT DOCUMENTS

| 968,339 | A | 8/1910 | Geraldson |
|---|---|---|---|
| 1,144,505 | A | 6/1915 | Steffan |

(Continued)

FOREIGN PATENT DOCUMENTS

| CA | 781808 | 4/1968 |
|---|---|---|
| CA | 839101 | 4/1970 |
| EP | 0 472 613 | 4/1992 |

OTHER PUBLICATIONS

Skyhook (Harrier handling system); Harpoon Head Quarters; available at http://www.harpoondatabases.com/encyclopedia/Entry2979.aspx; printed Jun. 21, 2013 (3 pages).

(Continued)

*Primary Examiner* — Joseph W Sanderson
(74) *Attorney, Agent, or Firm* — Neal, Gerber & Eisenberg LLP

(57) ABSTRACT

For retrieval of a hovering aircraft, a cable, bar, or similar fixture is suspended in an approximately horizontal orientation across the retrieval area between two well-separated supports. The aircraft slowly flies into this fixture, which then slides along the aircraft in a direction approximately parallel with the aircraft's thrust line. This leads to the aircraft becoming fastened to the fixture by an interceptor or aircraft capturer, which in alternative embodiments are respectively on the aircraft or the fixture or both. Thrust is then reduced, and the aircraft comes to rest hanging from the fixture for subsequent removal. Retrieval is thus accomplished with simple and economical apparatus, light and unobtrusive elements on the aircraft, low risk of damage, and only moderate piloting accuracy.

28 Claims, 20 Drawing Sheets

(56) References Cited

U.S. PATENT DOCUMENTS

| | | | |
|---|---|---|---|
| 1,383,595 A | 7/1921 | Black | |
| 1,499,472 A | 7/1924 | Pratt | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 2,435,197 A | 2/1948 | Brodie | |
| 2,448,209 A | 8/1948 | Boyer et al. | |
| 2,488,050 A | 11/1949 | Brodie | |
| 2,552,115 A | 5/1951 | Replogle | |
| 3,980,259 A | 9/1976 | Greenhalgh et al. | |
| 4,123,020 A | 10/1978 | Korsak | |
| 4,147,317 A | 4/1979 | Mayhew et al. | |
| 4,311,290 A | 1/1982 | Koper | |
| 4,680,962 A | 7/1987 | Durbin | |
| 4,753,400 A | 6/1988 | Reuter et al. | |
| 4,790,497 A | 12/1988 | Yoffe | |
| 4,842,222 A | 6/1989 | Baird | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,510,145 B2 | 3/2009 | Snediker | |
| 7,712,702 B2 | 5/2010 | McGeer et al. | |
| 7,954,758 B2 | 6/2011 | McGeer et al. | |
| 8,245,968 B2 | 8/2012 | McGeer et al. | |
| 8,348,193 B2 | 1/2013 | McGeer et al. | |
| 8,453,966 B2 * | 6/2013 | McGeer et al. | 244/110 F |
| 8,464,981 B2 * | 6/2013 | Goldie et al. | 244/110 E |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0133665 A1 | 6/2005 | Dennis et al. | |
| 2005/0151014 A1 | 7/2005 | McGeer | |
| 2005/0178894 A1 | 8/2005 | McGeer et al. | |
| 2005/0178895 A1 | 8/2005 | McGeer et al. | |
| 2005/0189450 A1 | 9/2005 | Roeseler et al. | |
| 2005/0230536 A1 | 10/2005 | Dennis et al. | |
| 2006/0065780 A1 | 3/2006 | Rednikov | |
| 2006/0102783 A1 | 5/2006 | Dennis et al. | |
| 2006/0175463 A1 | 8/2006 | McGeer | |
| 2006/0175466 A1 | 8/2006 | Snediker et al. | |
| 2006/0249623 A1 | 11/2006 | Steele | |
| 2007/0051849 A1 | 3/2007 | Watts et al. | |
| 2007/0075185 A1 | 4/2007 | McGeer et al. | |
| 2007/0158498 A1 | 7/2007 | Snediker | |
| 2007/0252034 A1 | 11/2007 | McGeer et al. | |
| 2008/0156932 A1 | 7/2008 | McGeer et al. | |
| 2008/0203220 A1 | 8/2008 | Hanzlick et al. | |
| 2009/0224097 A1 | 9/2009 | Kariv | |
| 2011/0024559 A1 | 2/2011 | McGeer et al. | |
| 2011/0133024 A1 | 6/2011 | McGeer et al. | |
| 2011/0233329 A1 | 9/2011 | McGeer et al. | |
| 2012/0187243 A1 * | 7/2012 | Goldie et al. | 244/110 C |
| 2012/0273612 A1 * | 11/2012 | McGeer et al. | 244/110 F |
| 2013/0161447 A1 * | 6/2013 | McGeer et al. | 244/110 F |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 29, 1999 (25 pages).
Aerosonde hazard estimation, T. McGeer, 1994 (7 pages).
Aerosonde Pacific reconnaissance: ready when you are!, T. McGeer, Pacific Northwest Weather Workshop, Mar. 2005 (15 pages).
An Airspeed Vector Sensor for V/STOL Aircraft, E. Durbin and T. McGeer, Journal of Aircraft, vol. 19, No. 6, Jun. 1982 (7 pages).
Autonomous Aerosondes for Economical Atmospheric Soundings Anywhere on the Globe, G.J. Holland, T. McGeer and H.H. Youngren, Bulletin of the American Meteorological Society, vol. 73, No. 12, Dec. 1992 (12 pages).
Automated Launch, Recovery, and Refueling for Small Unmanned Aerial Vehicles, K. Mullens, et al., 2004 (11 pages).
International Search Report (PCT/US2007/076276), dated Sep. 22, 2008 (7 pages).
Laima: The First Atlantic Crossing by Unmanned Aircraft, T. McGeer, Feb. 25, 1999 (25 pages).
Quantitative Risk Management as a Regulatory Approach to Civil UAVs, T. McGeer, L. Newcombe, and J. Vagners, International Workshop on UAV Certification, Jun. 4, 1999 (11 pages).
Regulatory Issues Involving Long-Range Weather Observation by Aerosonde Autonomous Aircraft, T. McGeer, Oct. 9, 1998 (8 pages).
Safety, Economy, Reliability and Regulatory Policy for Unmanned Aircraft, T. McGeer, Mar. 2007 (9 pages).
The Beartrap—A Canadian Invention, Crowsnest Magazine, vol. 17, Nos. 3 and 4 [online], Mar.-Apr. 1965, [retrieved on Sep. 14, 2007]. Retrieved from the Internet at <URL: http://www.readyayeready.comftimelinef1960s/beartrapfindex.htm> (4 pages).
Wide-Scale Use of Long-Range Miniature Aerosondes Over the World's Oceans, T. McGeer and J. Vagners, 1999 (25 pages).
Written Opinion (PCT/US2007/076276), dated Mar. 5, 2009 (6 pages).
Examiner's First Report for Australian Patent Application No. 2007347147, dated Oct. 26, 2011 (2 pages).
Flexrotor Long-Endurance VTOL Aircraft Transitions to Wing-Borne Flight, Aug. 4, 2011 (2 pages).
European Search Report for European Patent Application No. 10250229.1, dated Jan. 21, 2013 (5 pages).

* cited by examiner

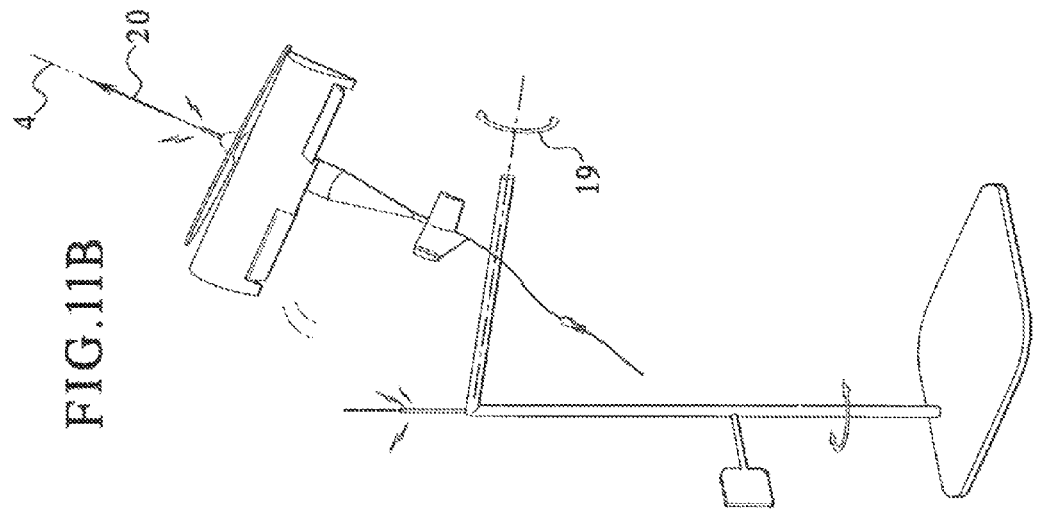
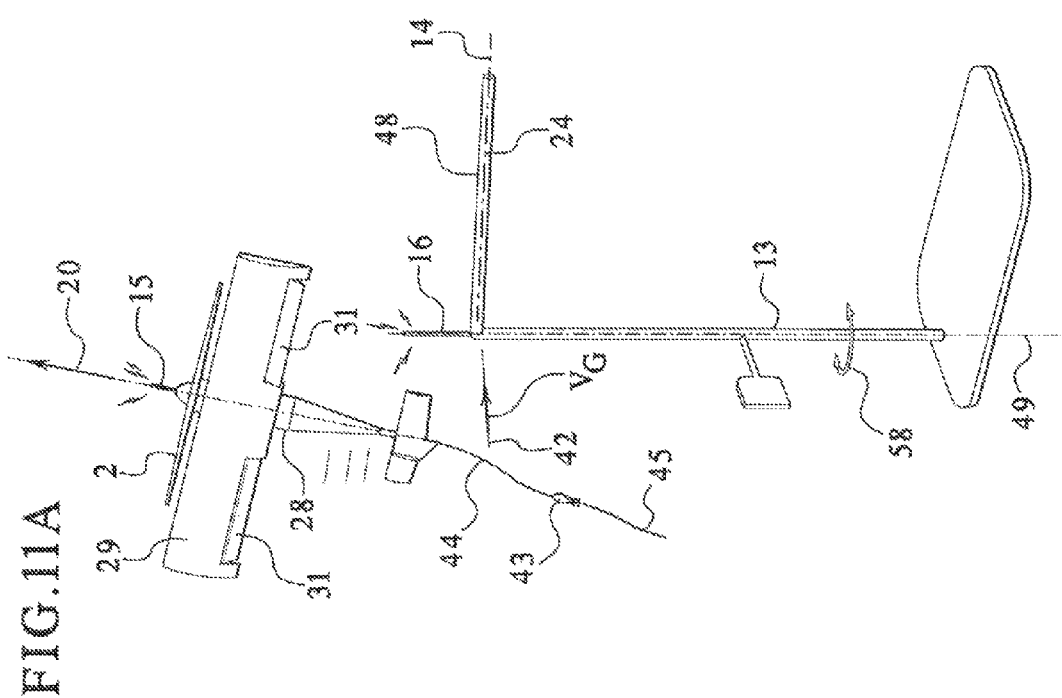

METHOD AND APPARATUS FOR RETRIEVING A HOVERING AIRCRAFT

PRIORITY CLAIM

This application is a continuation of, and claims priority to and the benefit of, U.S. patent application Ser. No. 13/540,032, filed on Jul. 2, 2012, which issued as U.S. Pat. No. 8,348,193 on Jan. 8, 2013, which is a continuation of, and claims priority to and the benefit of, U.S. patent application Ser. No. 13/024,843, filed on Feb. 10, 2011, which issued as U.S. Pat. No. 8,245,968 on Aug. 21, 2012, which is a divisional of, and claims priority to and the benefit of, U.S. patent application Ser. No. 11/837,878, filed on Aug. 13, 2007, which issued as U.S. Pat. No. 7,954,758 on Jun. 7, 2011, which is a non-provisional of, and claims priority to and the benefit of, U.S. Provisional Patent Application No. 60/823,442, filed on Aug. 24, 2006, the entire contents of each of which are incorporated herein by reference.

CROSS REFERENCE TO RELATED APPLICATIONS

The present application relates to the following commonly-owned co-pending patent applications: U.S. patent application Ser. No. 13/037,436, filed on Mar. 1, 2011; U.S. patent application Ser. No. 13/527,177, filed on Jun. 19, 2012; U.S. patent application Ser. No. 13/717,147, filed on Dec. 17, 2012; U.S. patent application Ser. No. 13/743,069, filed on Jan. 16, 2013; U.S. patent application Ser. No. 13/900,191; U.S. patent application Ser. No. 13/899,172, filed on May 21, 2013; U.S. patent application Ser. No. 13/901,283, filed on May 23, 2013; U.S. patent application Ser. No. 13/901,295, filed on May 23, 2013; and U.S. patent application No. 14/034,097, filed on Sep. 23, 2013.

NOTICE OF GOVERNMENT RIGHTS

This invention was made with U.S. Government support under Contract No. W31P4Q-06-C-0043, effective Nov. 23, 2005 ("the contract"), issued by U.S. Army Aviation and Missile Command. The U.S. Government has certain rights in the invention. More specifically, the U.S. Government has a paid-up license in this invention and the right in limited circumstances to require the patent owner to license others on reasonable terms as provided for by the terms of the contract.

BACKGROUND

1. Field

The present disclosure addresses retrieval of a hovering aircraft, especially in turbulent winds or onto a rough or irregularly-moving surface, such as the deck of a ship in a rough sea. The present disclosure is especially suited to unmanned aircraft of small size, and requires only modest accuracy in automatic or manual piloting.

2. Description of Prior Art

Hovering aircraft, be they helicopters, thrust-vectoring jets, "tail-sitters," or other types, usually land by gently descending in free thrust-borne flight onto a landing surface, coming to rest on an undercarriage of wheels, skids, or legs. This elementary technique can be problematic in certain situations, for example when targeting a small, windswept landing pad on a ship moving in a rough sea. Decades ago, the Beartrap or RAST system was developed to permit retrieval with acceptable safety in such conditions. Retrieval with this system involves securing a line between a helicopter and landing deck, and then winching the helicopter down onto a trolley. The helicopter is fastened to the trolley. After retrieval, the trolley is used to move the helicopter along the deck. The system is effective and widely used, but requires an expensive and substantial plant in the landing area, and coordination between aircraft and ground crew. Furthermore, the helicopter must carry a complete undercarriage in addition to the necessary Beartrap components.

By comparison, simple methods for retrieving aircraft from wing-borne flight into a small space have been described in U.S. Pat. No. 6,264,140 and U.S. Pat. No. 6,874,729. These involve flying the aircraft into a cable suspended in an essentially vertical orientation. Typically, the cable strikes a wing of the aircraft and slides spanwise along the wing into a hook; the hook snags the cable; the cable decelerates the aircraft briskly but smoothly; and the aircraft comes to rest hanging by its hook. Advantages of this technique include: simplicity of the apparatus; relatively easy targeting, since the aircraft can make contact anywhere within its wingspan and almost anywhere along the cable; elimination of undercarriage from the aircraft; and safety, since the aircraft simply continues in wing-borne flight if it misses the cable, and since all components, apart from the cable itself, are kept well clear of the flight path.

SUMMARY

One embodiment of the present disclosure provides for snag-cable retrieval of thrust-borne or hovering aircraft, and particularly those with large rotors. The present disclosure offers the same advantages as does snag-cable retrieval for wing-borne aircraft; namely, simplicity, relatively easy targeting, elimination of undercarriage, and safety.

Furthermore, since loads can be low during retrieval from hover, the apparatus can be light, inexpensive, and easy to deploy. Easy targeting makes the technique well-suited for both manual control and economical automation.

Additional features and advantages are described herein, and will be apparent from the following Detailed Description and the Figures.

BRIEF DESCRIPTION OF THE FIGURES

FIGS. 11A, 11B, 11C, and 11D are a series of diagrammatic rear-quarter perspective views of an embodiment of the present disclosure for a hovering aircraft, showing the aircraft sequentially approaching, engaging, and hanging from a cantilever retrieval fixture that has a set of cleats for engaging the aircraft.

DETAILED DESCRIPTION

Figure 1A:
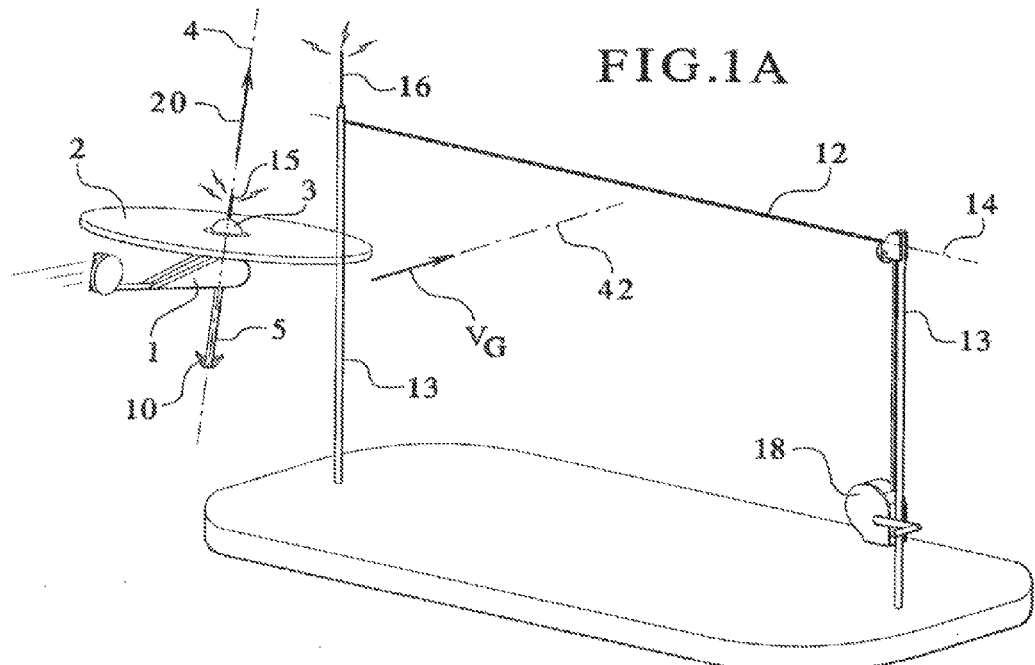
FIGS. 1A, 1B, 1C, and 1D are a series of diagrammatic rear-quarter perspective views of an embodiment of the present disclosure for a helicopter, showing the helicopter sequentially approaching above, sliding along, decelerating against, and hanging from a retrieval cable.
Figure 1B:
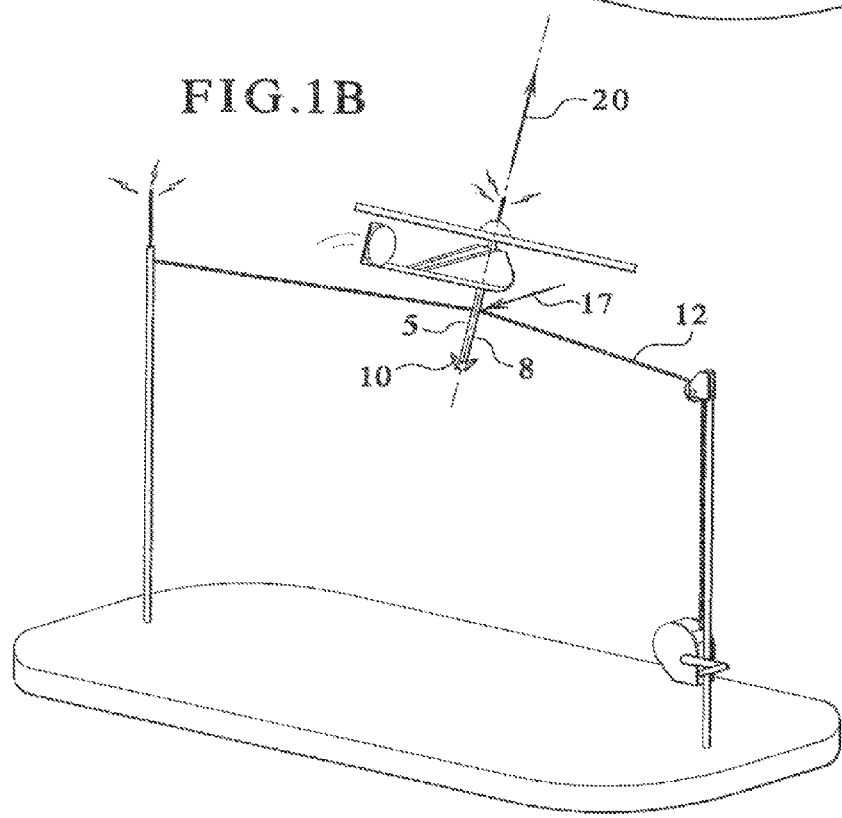
Figure 1C:
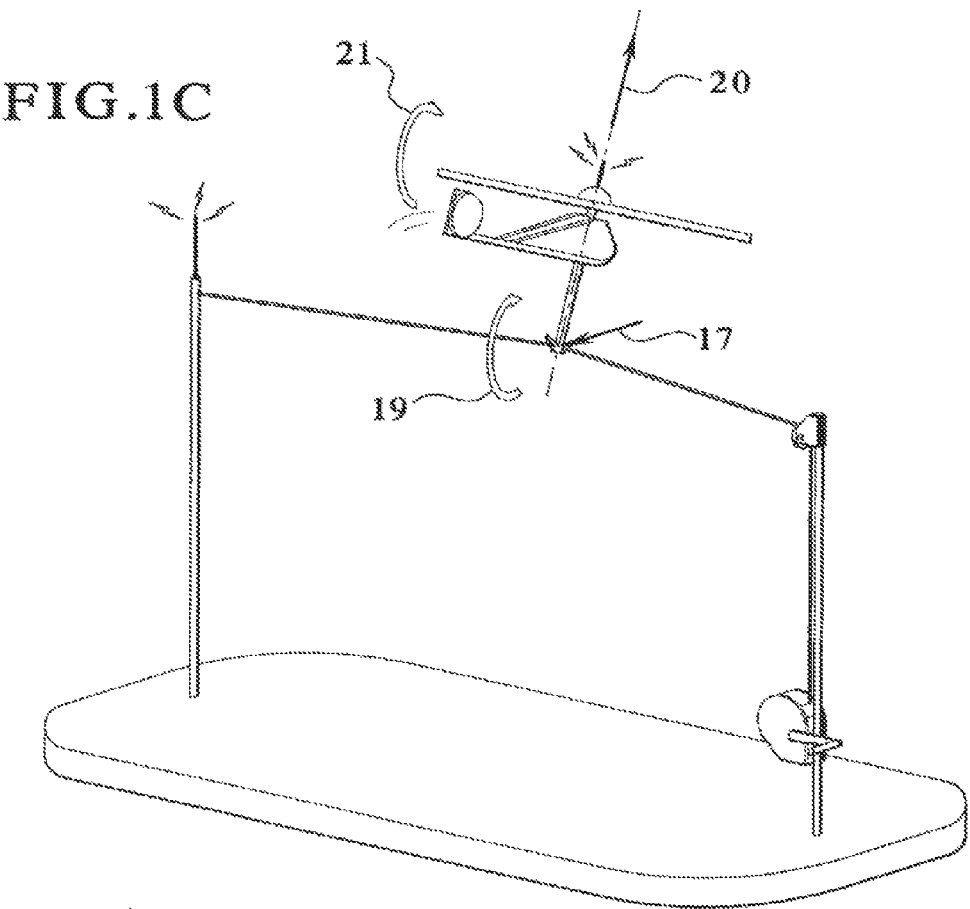
Figure 1D:
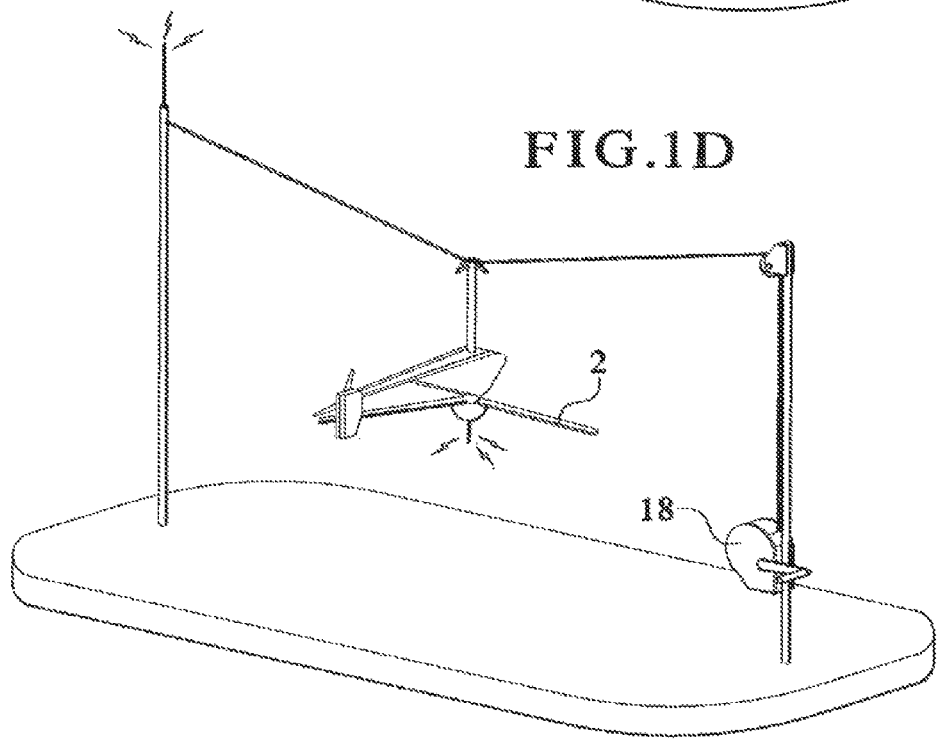

FIGS. 1A, 1B, 1C, and 1D show an illustrative embodiment of the present disclosure, as used with a helicopter of conventional layout. This embodiment includes a retrieval fixture in the form of a cable 12 that is suspended by supports 13 across the intended landing area. The supports 13 are sufficiently separated to allow the helicopter 1 to comfortably pass between them. In preparation for retrieval, the helicopter 1 extends an interceptor, which in one embodiment includes a pole 5. The interceptor also includes one or more hooks 10 attached to the end of the pole 5 as, for example, shown in FIG. 2. The helicopter 1 approaches the cable 12 in slow, nearly-horizontal flight at speed VG along a path 42 at a suitably large angle relative to the line 14 between the supports 13. In one embodiment, the approach is flown automatically, with three-dimensional position and velocity of the helicopter 1 relative to the cable 12 being measured, for example, by differencing satellite-navigation solutions between an antenna 15 on the helicopter and on a reference point 16 near the cable. Approach brings the pole 5 into contact with the cable 12, which then applies a force as indicated by arrow 17 to the surface 8 of the pole 5. The cable 12 then slides along the pole 5. This can be arranged by: (a) deploying the pole 5 with a suitable sweepback angle relative to the line of approach; or (b) by making the pole attachment compliant under the cable load 17; or (c) by attaching the pole 5 rigidly along the spin axis 4 of the rotor 2, leaving the cable load 17 to rotate the helicopter 1 bodily about the cable axis 14; or (d) by a suitable combination of these arrangements.

Figure 2:
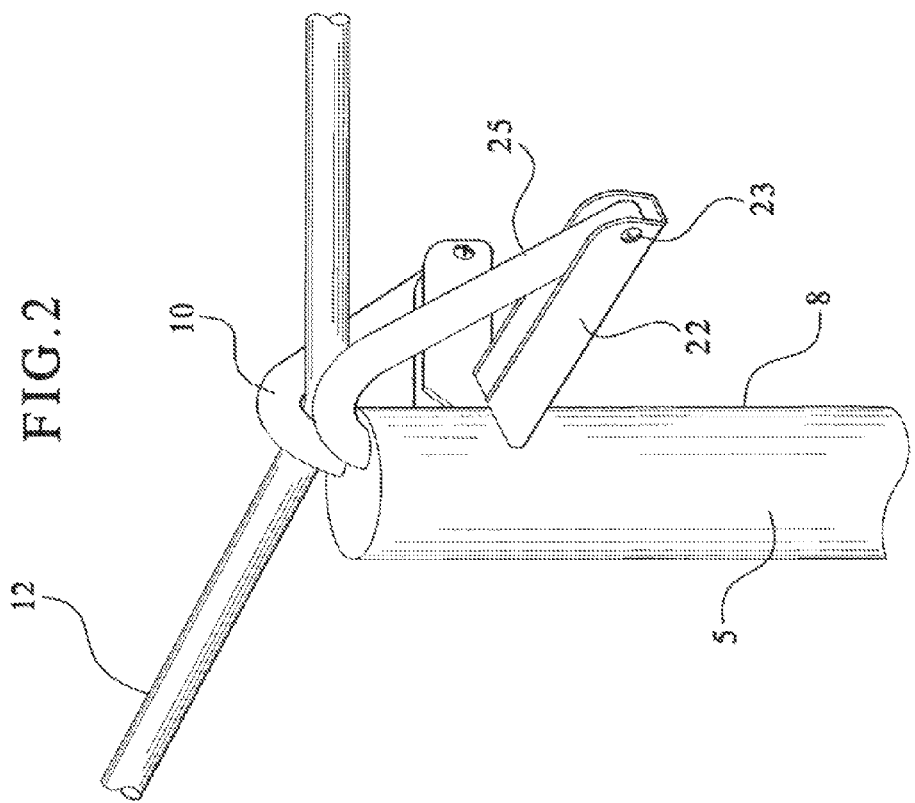
FIG. 2 is a perspective view of a representative hook installation on a pole deployed by a helicopter or fixed wing aircraft, as constructed according to one embodiment of the present disclosure.
Figure 4A:
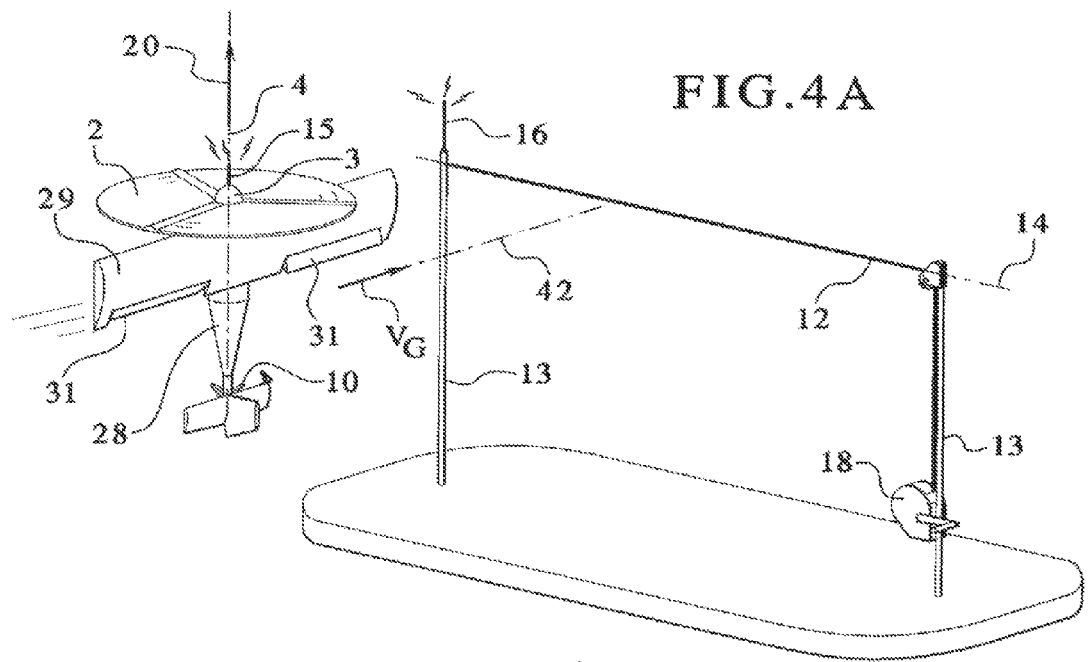
FIGS. 4A, 4B, 4C, and 4D are a series of diagrammatic rear-quarter perspective views of an embodiment of the present disclosure for a hovering aircraft, showing the aircraft sequentially approaching, sliding along, decelerating against, and hanging from a retrieval cable.
Figure 4B:
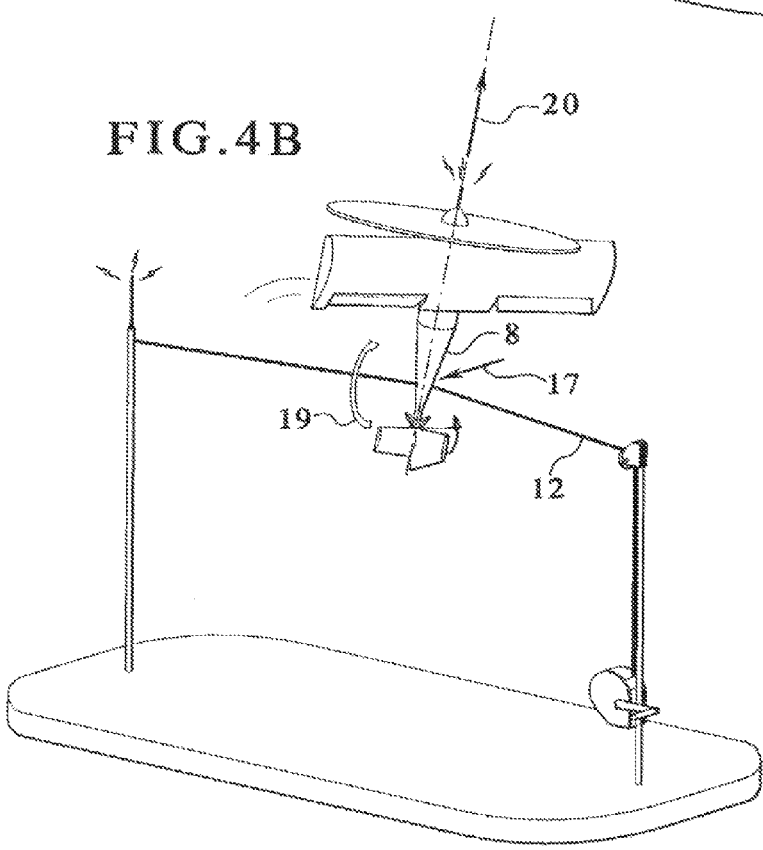
Figure 4C:
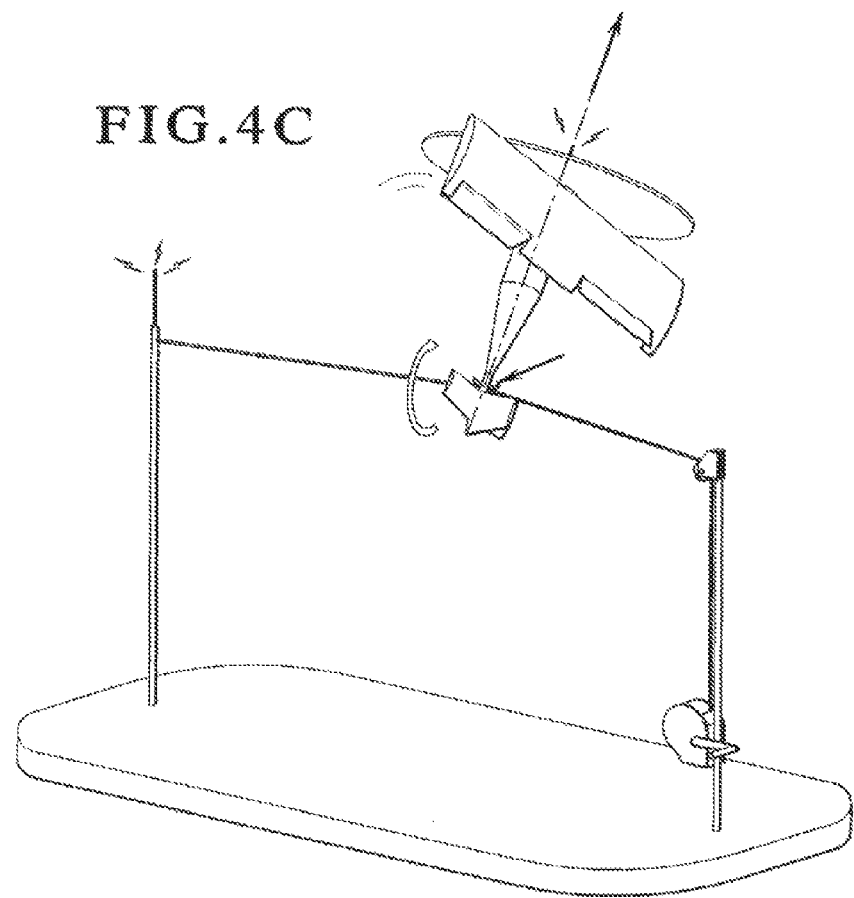
Figure 4D:
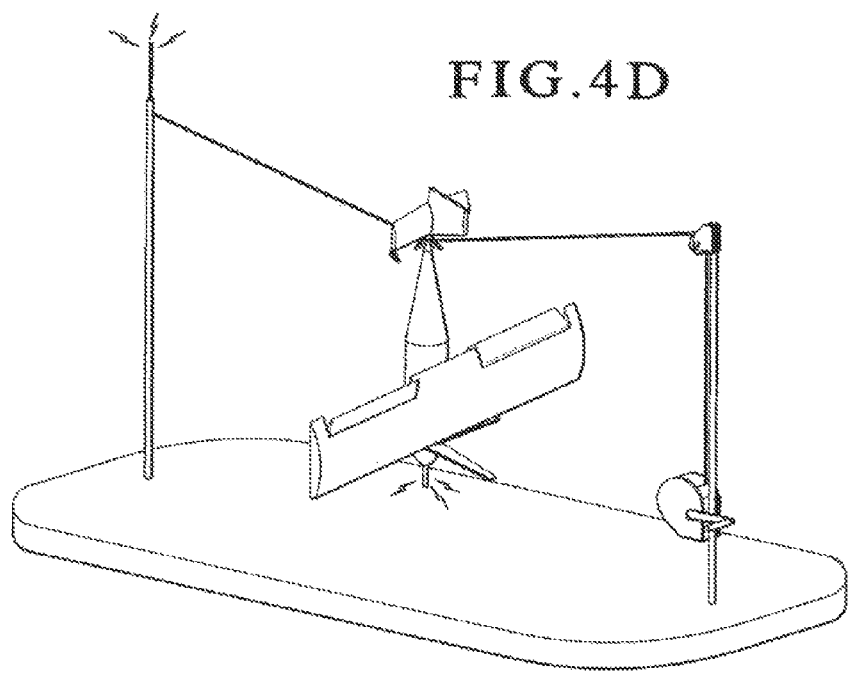

Sliding directs the cable 12 through a gate 22 into a hook 10 as shown in FIG. 2, and the gate 22 then closes to ensure that the cable 12 will not be released until desired. Closing of the gate 22 may be sensed directly, or inferred from deflection of the pole 5 under the cable load 17, or from deceleration or rotation of the helicopter 1. When capture of the cable 12 is recognized, drive power is reduced and the rotor 2 gradually slows to a stop. The helicopter 1 comes to rest hanging upside-down from the cable 12. A winch 18 or other suitable device for adjusting the height of the cable 12 can then be used to lower the helicopter 1 onto a handling platform. The hook 10 can then be released. Alternatively, a small helicopter 1 can be removed from the cable 12 by hand.

If the approach speed of the helicopter 1 is sufficiently high, then the cable 12 may have to comply in order to make deceleration loads acceptably small. This may be done by: (a) incorporating elastic segments into the cable 12; or (b) by paying-out slack from a winch 18 in order to control tension in the cable 12; or (c) by a combination thereof. In either case, provision may be made quickly to take up the slack during the latter part of deceleration in order to limit sag of the helicopter 1 as it comes to rest.

It should be noted that instead of deploying the retrieval-fixture interceptor downward as in FIG. 1, the helicopter 1 in an alternative embodiment could deploy the interceptor upward from its rotor hub 3. It would then approach so that its rotor 2 passes below rather than above the cable 12, and it would come to rest hanging right-side-up rather than upside-down. While coming to rest right-side-up would be desirable, especially for a manned helicopter, passing above the cable 12 as in FIG. 1 offers two safety advantages over passing below. First, it increases the clearance between the cable 12 and the rotor 2 during approach. Second, it permits the helicopter 1 to attempt a climb to test for capture (much as a fixed-wing aircraft landing on an aircraft carrier increases power immediately at touchdown). Thus, shortly after passing the cable axis 14, or upon detecting an indication of contact with or capture of the cable 12, power to the rotor 2 can be increased. If capture has not occurred, then the helicopter 1 will climb away from the retrieval area and can return for another approach. If the helicopter 1 fails to climb, then this can be taken as confirmation that capture has occurred, and power can be reduced. The helicopter 1 will then descend, and be left hanging upside-down from the cable 12. Swinging motion, including rotations about the approach axis 42 caused by rotor gyroscopic effect, can be damped by appropriate management of rotor thrust and in-plane moments during deceleration.

FIG. 2 shows a detailed view of an installation of carabiner-type hooks 10 in one embodiment of the present disclosure. A cable 12 slides along a surface 8 onto a one-way gate 22, which then opens about a hinge 23. The cable 12 is captured when the gate 22 closes behind it. Meanwhile, the cable 12 remains free to slide along its axis through the hook 10. In one embodiment, the hook 10 includes a sloped deflector surface 25. If the cable 12 misses the capture aperture and strikes the deflector surface 25, then it will be directed to slide clear of the aircraft with low applied force.

Figure 3:
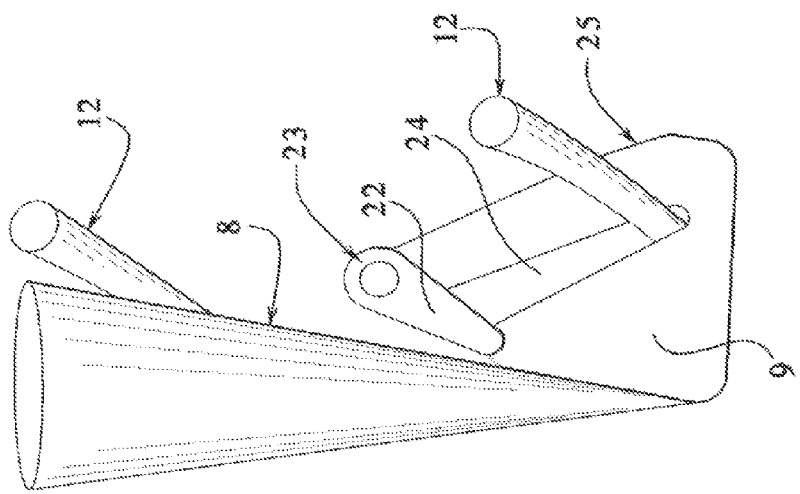
FIG. 3 is plan view of an embodiment of a clamping hook constructed according to one embodiment of the present disclosure.

FIG. 3 shows an alternative embodiment of a hook of the present disclosure, which includes a slot 24 to clamp the cable 12 in the manner of a jam cleat. This prevents the captured cable 12 from sliding along its axis relative to the hook 9. It should be appreciated that other suitable forms of the hook or hook installation may be employed in accordance with the present disclosure.

Figure 5:
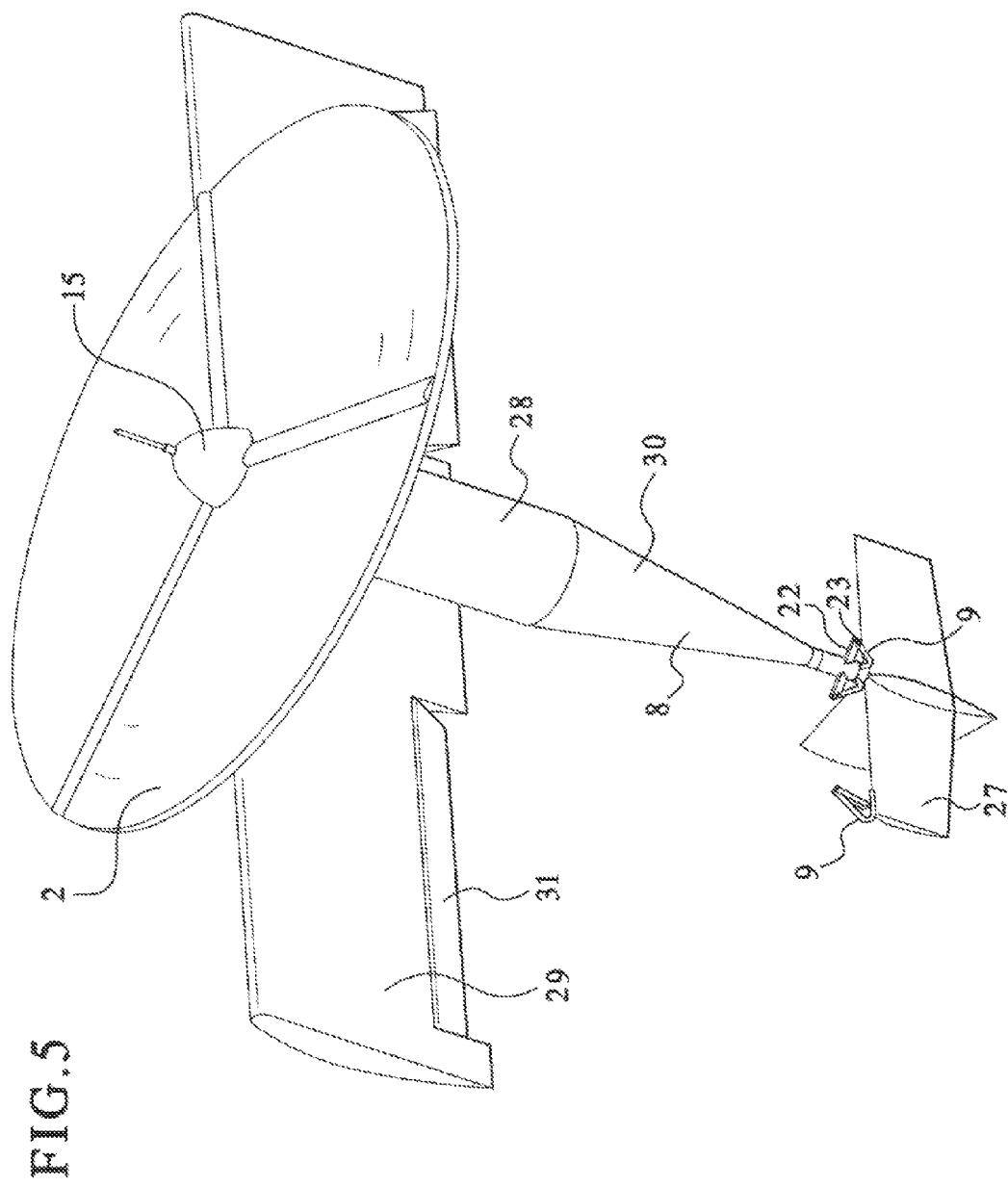
FIG. 5 is a perspective view of a hook installation on a cruciform empennage, according to one embodiment of the disclosure
Figure 6A:
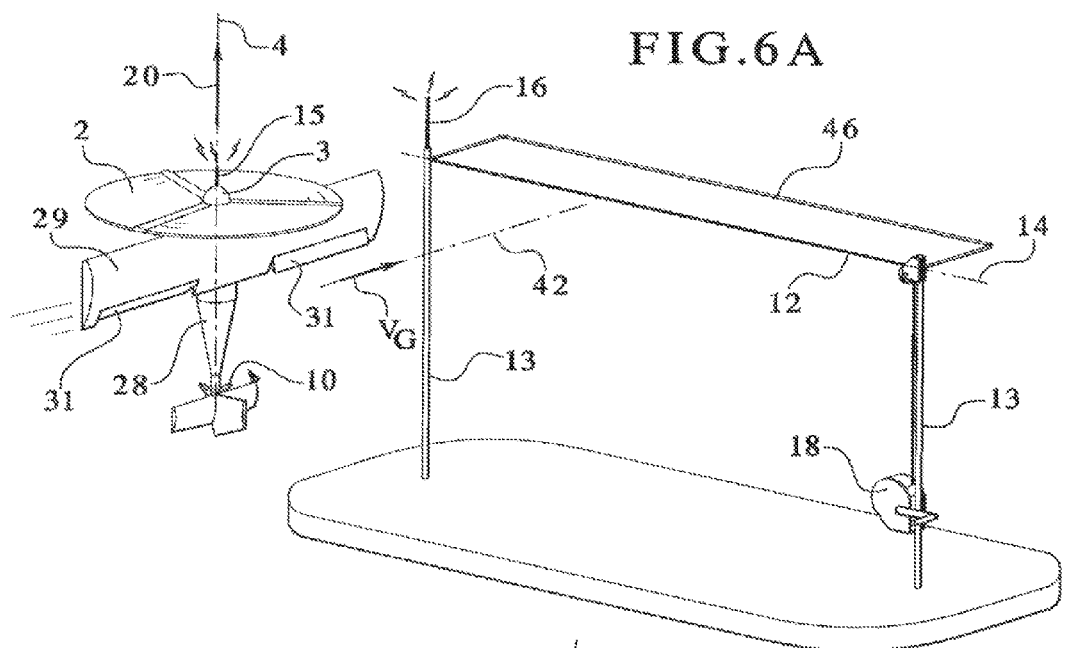
FIGS. 6A, 6B, 6C, and 6D are a series of diagrammatic rear-quarter perspective views of an embodiments of the present disclosure for a hovering aircraft, showing the aircraft sequentially approaching, sliding along, and decelerating against a retrieval cable, and coming to rest on an adjacent support cable.
Figure 6B:
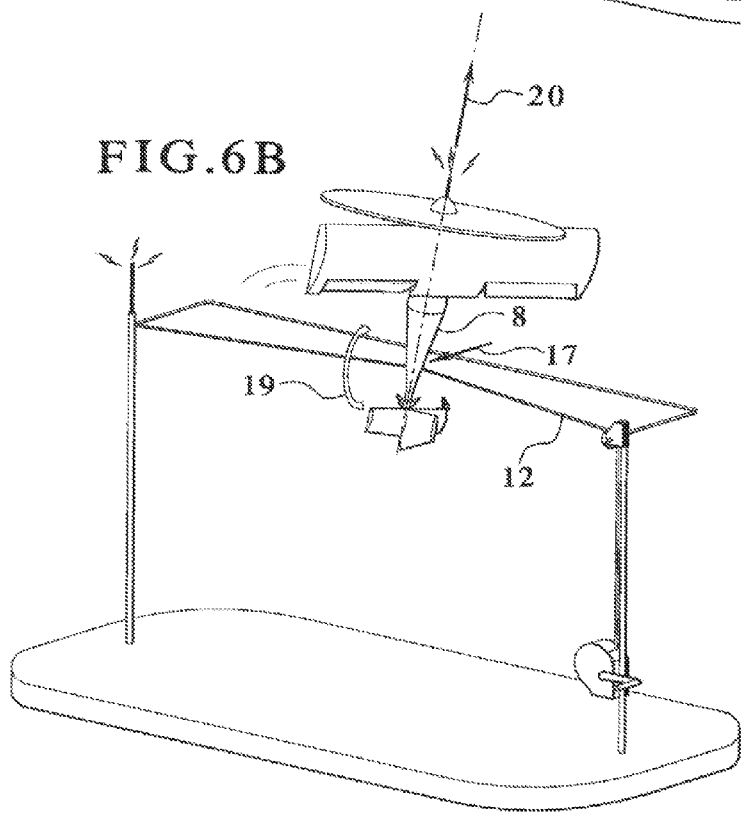
Figure 6C:
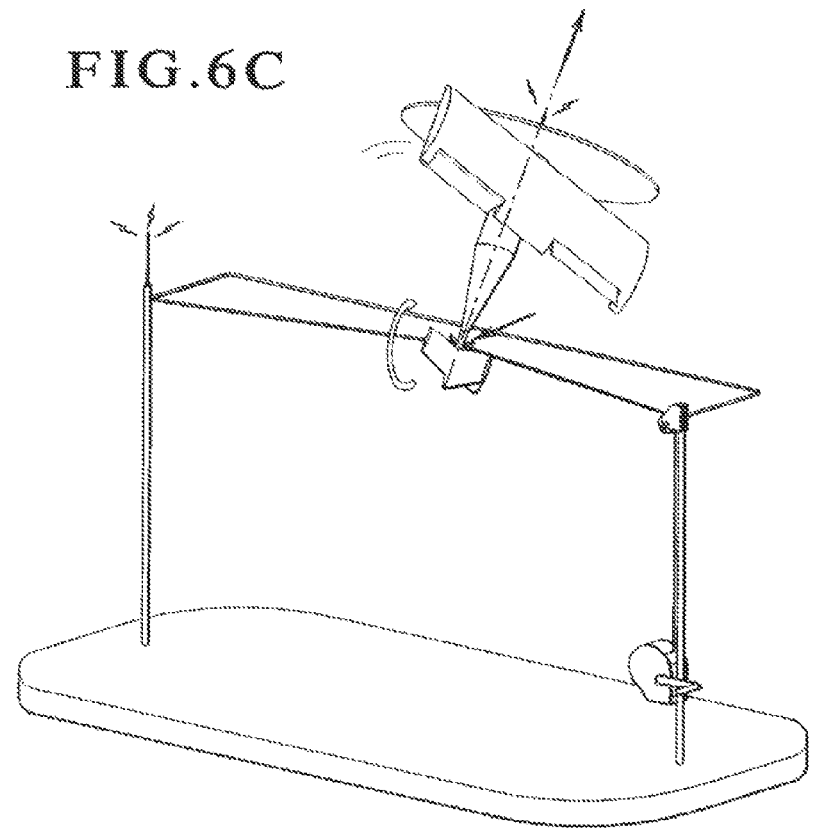
Figure 6D:
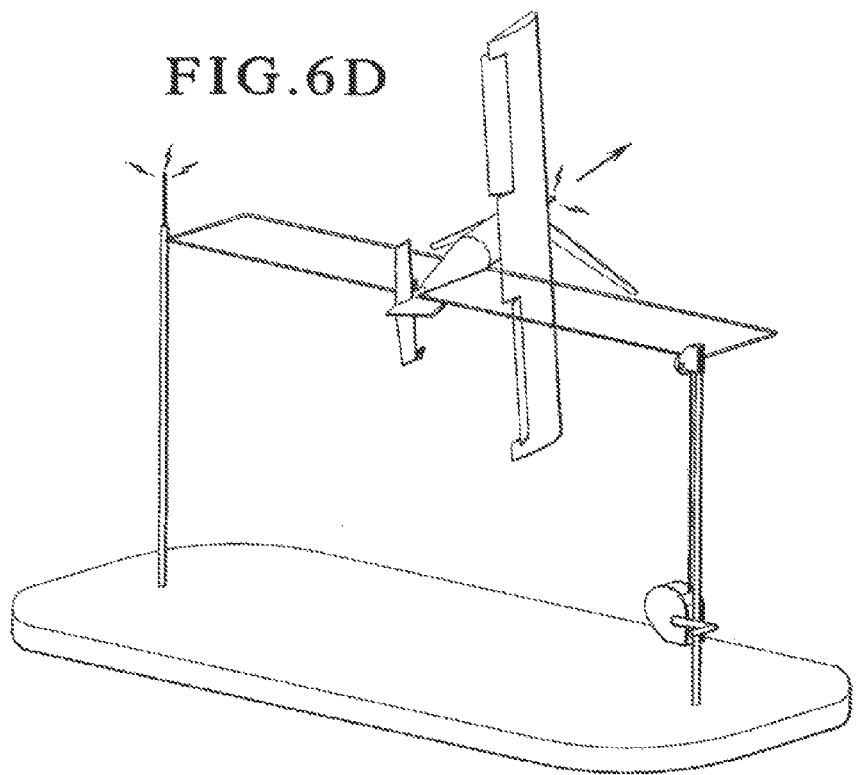

FIGS. 4A, 4B, 4C, and 4D show another embodiment applied to an aircraft 28 having a configuration suited to efficient wing-borne flight. The aircraft 28 has a fixed wing 29 and a propeller 2 installed at its nose. The propeller's spin axis 4 is aligned with the fuselage. The retrieval pole of the interceptor as in FIGS. 1A to 1D is unnecessary, since the aft fuselage 8 provides a suitable surface for intercepting the cable 12, and hooks 10 can be mounted on the rear of the fuselage 8 as shown in FIG. 5. It should be appreciated that in an alternative embodiment, an interceptor having a retrieval pole may be employed. To prepare for retrieval, the aircraft 28 pitches up from forward flight, with its thrust line near horizontal, into hovering flight, with its thrust line near vertical. Rotor thrust 20 is adjusted to balance aircraft weight. The thrust vector 20 is tilted along the approach path 42, and the aircraft 28 slowly draws the rear surface of its fuselage 8 across the retrieval cable 12. The cable load indicated by arrow 17 causes the aircraft 28 to tilt further along the approach path 42 as indicated by arrow 19. The cable 12 slides along the fuselage 8 (as shown in FIG. 5) and through a gate 22 into a hook 9. Retrieval is then completed in the same or similar manner as for the helicopter 1 in FIG. 1. The aircraft 28 finishes hanging nose-down on the cable 12. Again, this would be impractical for a manned aircraft, but quite acceptable for an aircraft that is small and unmanned.

FIGS. 6A, 6B, 6C, and 6D show another embodiment in which a second cable 46 is attached to the cable supports 13 adjacent and essentially or substantially parallel to the snag cable 12. The position of this second cable 46 is such that the aircraft is intercepted as it rotates around the snag cable 12, and so comes to rest in a more nearly horizontal orientation than that shown in FIG. 4. The height of the snag cable 12 can therefore be reduced, and the final nose-down orientation avoided. It should be appreciated that more than one additional cables can be employed in alternative embodiments, and supported in any suitable manner. In other embodiments, a net, mattress, boom or similar support could perform the same function as the second cable 46. Of these choices, a second cable 46 has the advantage that it can exchange roles with the snag cable 12 depending upon the approach direction. In any case, the aircraft support 46 must be positioned so that it remains clear of the propeller as the aircraft comes to rest. It must also comply as necessary to arrest the aircraft without damage.

In any of these example embodiments, should the cable 12 not be captured because of incorrect altitude, failure to capture can be recognized as the cable axis 14 is passed. The aircraft can then climb away from the retrieval area and return for another approach.

Figure 7:
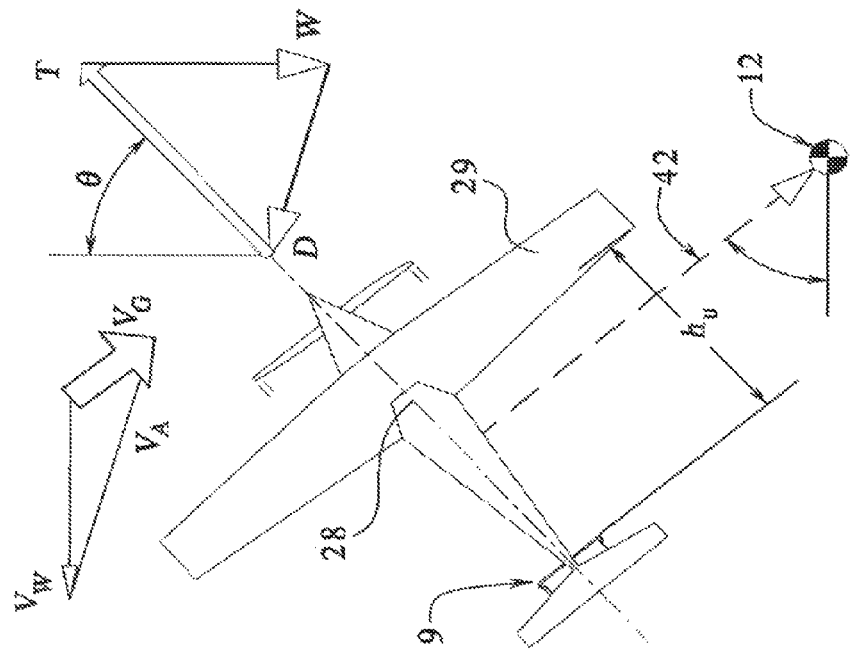
FIG. 7 is a side view of a hovering aircraft on a horizontal approach to a retrieval cable, with the approach made from upwind of the cable, and the wing aligned at knife-edge to the relative wind in order to minimize drag.
Figure 8:
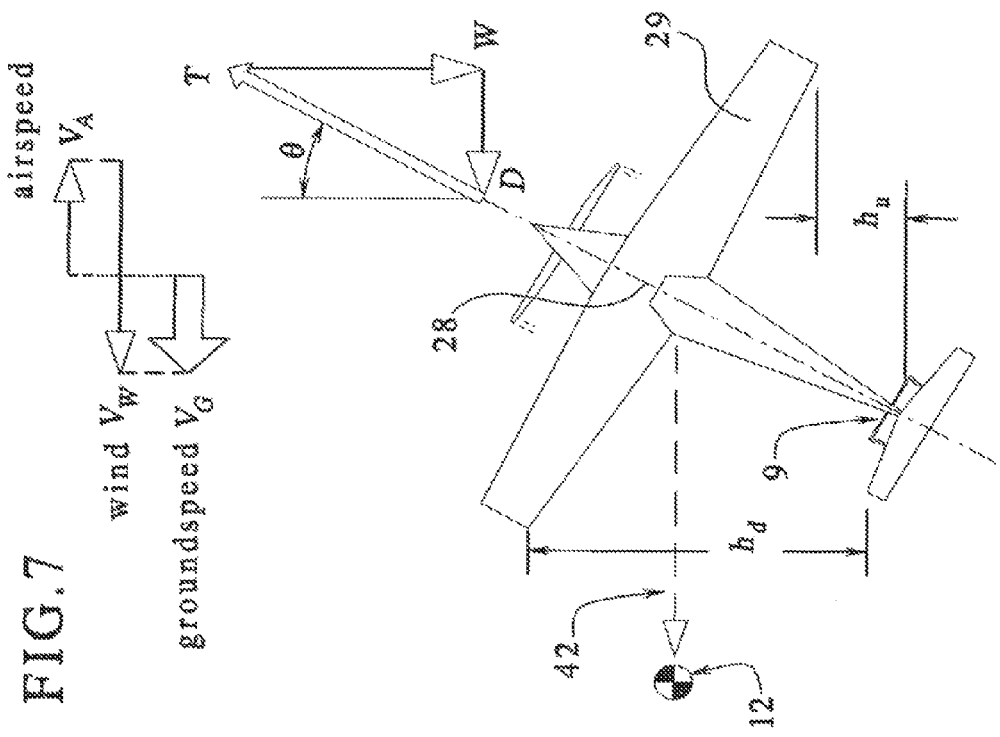
FIG. 8 is a side view of a hovering aircraft on a descending approach to a retrieval cable, with the approach made from downwind of the cable, and the wing aligned at knife-edge to the relative wind in order to minimize drag.
Figure 9:
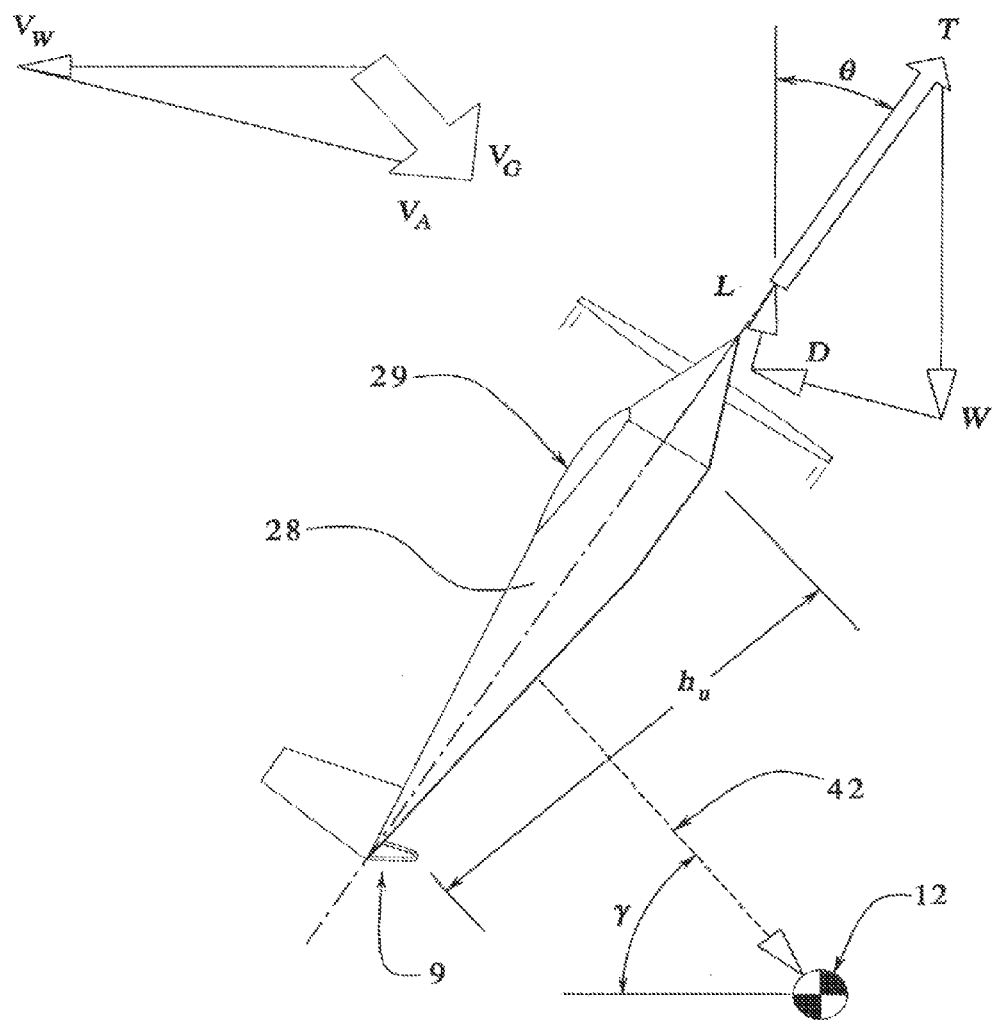
FIG. 9 is a side view of a hovering aircraft on a descending approach to a retrieval cable, with the approach made from downwind of the cable, and the wing generating lift.

FIG. 7, FIG. 8, and FIG. 9 illustrate possible paths for a fixed-wing aircraft to approach a retrieval cable 12 in a wind $V_W$. In general, the rotor thrust vector T opposes the sum of the weight vector W and the drag vector D. Thus, to maintain nonzero airspeed $V_A$, the thrust vector T must be tilted to balance drag D. Required thrust T and thrust-vector tilt θ are minimized by minimizing drag, which can be done by orienting the wing 29 at knife-edge to the wind $V_W$ as shown in FIG. 7 and FIG. 8.

For successful capture, the aircraft 28 must contact the cable 12 in an aperture between the wing 29 and the hook 9. When the airspeed vector $V_A$ is into-wind $V_W$, the thrust-vector tilt θ makes the aperture on the downwind side of the aircraft $h_d$ broader than the aperture on the upwind side $h_u$. Hence, guidance for a horizontal approach can be less precise if the aircraft approaches the cable 12 while moving downwind rather than upwind. In a sufficiently strong wind, tilt of the thrust vector could be so large that the upwind aperture hu would vanish, and a horizontal approach would have to be made downwind in order to engage the cable 12.

The approach, however, need not be horizontal. FIG. 8 shows an alternative in which the aircraft 28 approaches while descending into-wind with knife-edge wing orientation. If the slope γ of the approach path is selected to be approximately equal to the thrust-vector tilt θ, then the aperture $h_u$ for successful capture of the cable 12 is kept large. For a given wind speed $V_W$, this form of upwind approach requires more thrust (but not necessarily more power) than a downwind approach since it calls for higher airspeed.

A further possibility, as shown in FIG. 9, is to approach with the wing 29 in a lifting rather than knife-edge orientation. In this case, the vector sum of thrust T and lift L balances drag D and weight W. Again, the aircraft 28 presents maximum capture aperture $h_u$ to the cable 12 by approaching into-wind while descending on a slope γ which is approximately equal to the thrust-vector tilt θ. If the wind speed exceeds the stall airspeed in wing-borne flight, then descent can be vertical.

Of these approach methods, downwind drift in knife-edge orientation as in FIG. 7 requires the least thrust in a light wind. Wing-borne upwind descent as in FIG. 9 requires the least thrust in a strong wind. Hence, the best choice of approach path and aircraft orientation will depend at least in part on wind speed.

In an automatic approach, thrust-vector tilt θ and rotor power are adjusted to regulate the approach velocity vector $V_G$. Upon encountering the cable 12, progress is retarded, and the automatic-control logic calls for the thrust vector T to be tilted toward the approach path 42. This causes the aircraft 28 to rotate around the cable 12 in the desired direction indicated by arrow 19 in FIG. 4B, so that sliding of the cable 12 into the hook 10 is promoted.

Figure 10A:
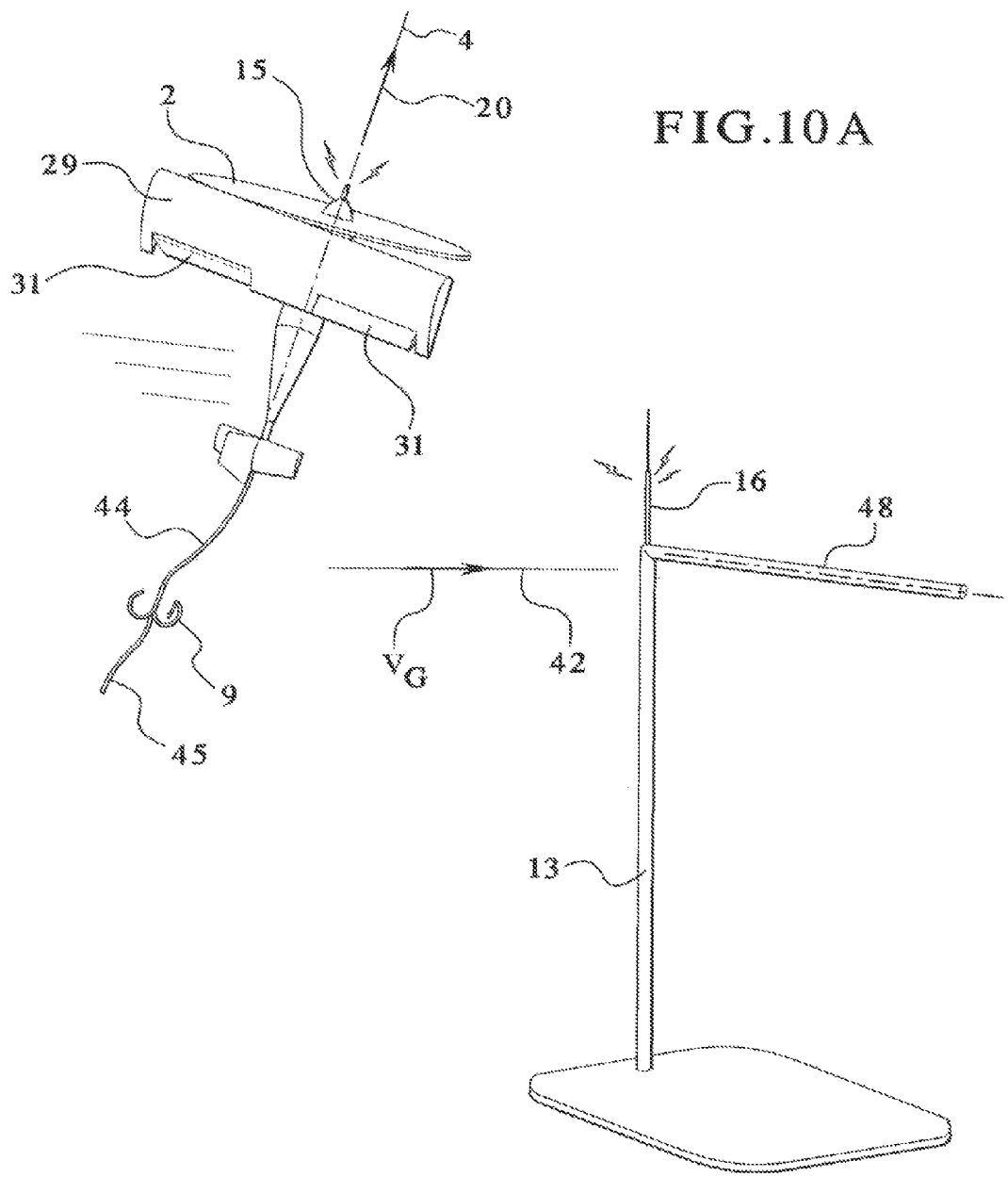
FIGS. 10A, 10B, and 10C are a series of diagrammatic rear-quarter perspective views of an embodiment of the present disclosure for a hovering aircraft, in which the aircraft uses a trailing string to capture a retrieval boom.
Figure 10C:
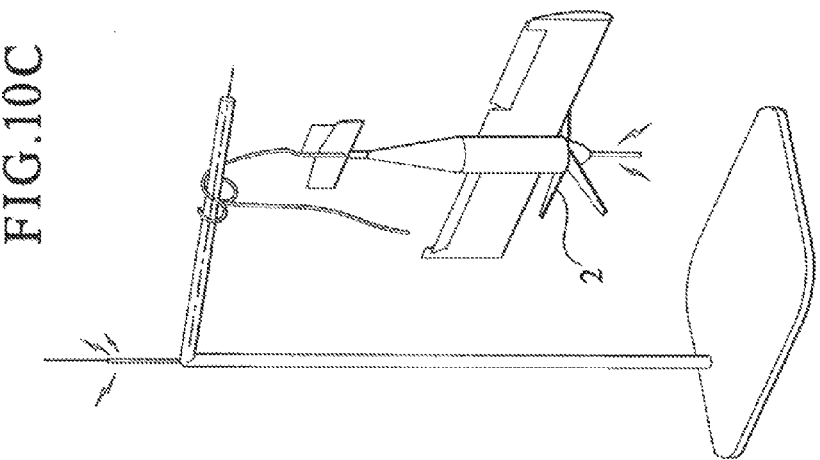
Figure 10B:
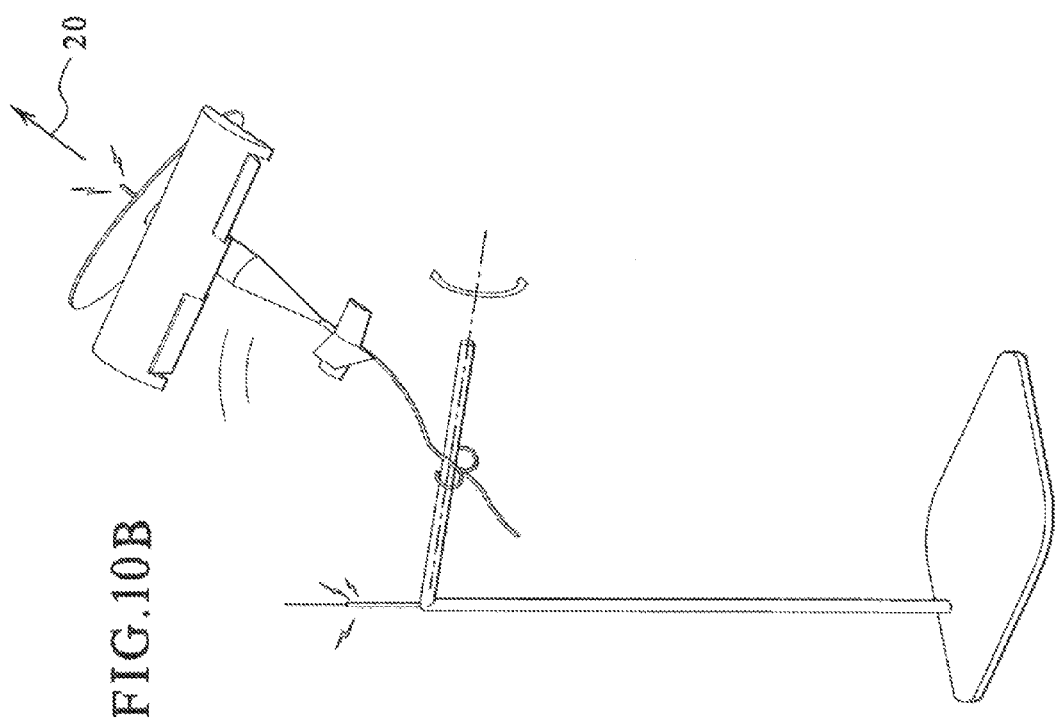
Figure 11D:
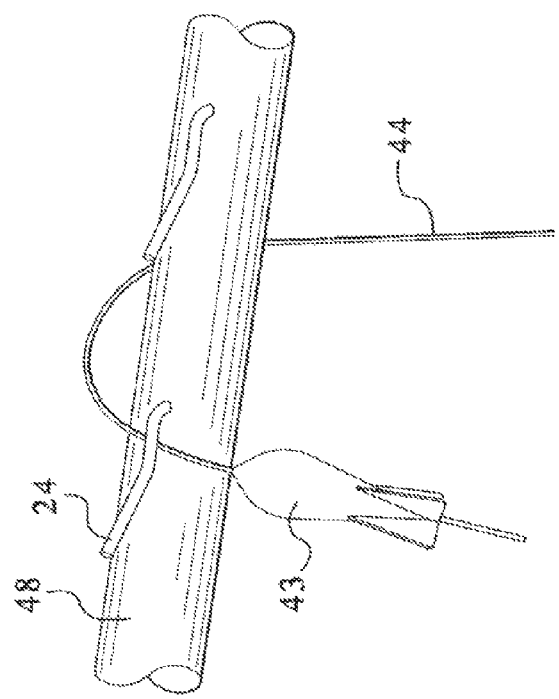
Figure 11C:
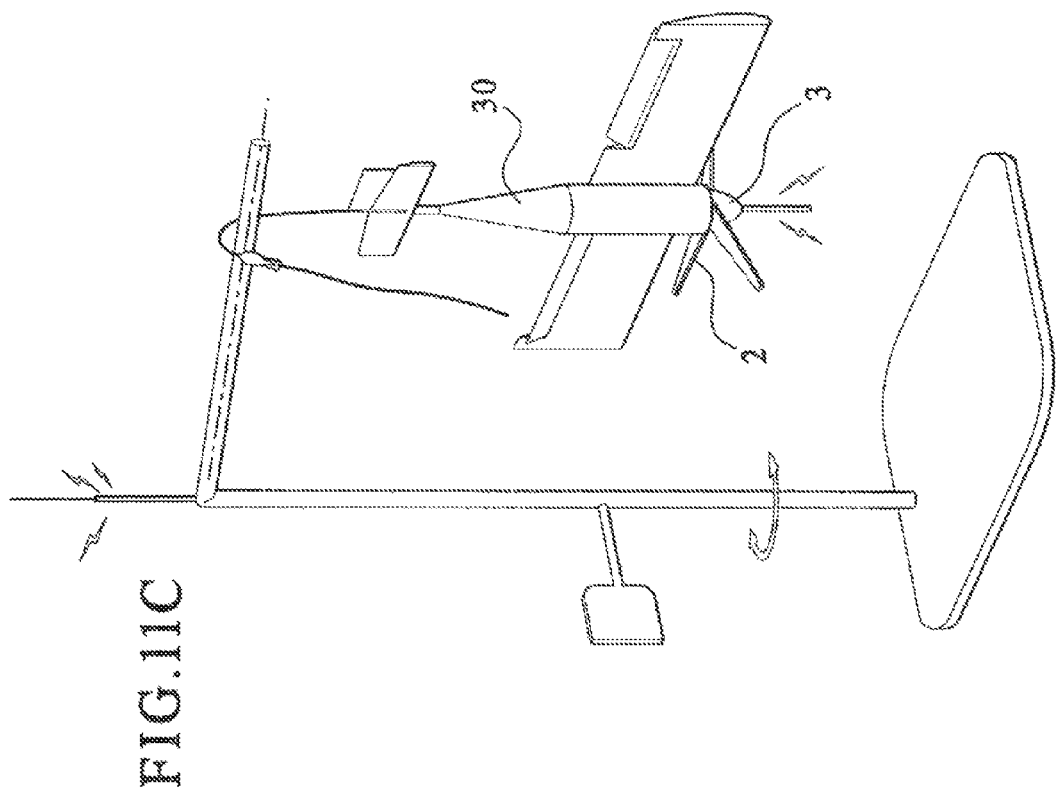
Figure 12A:
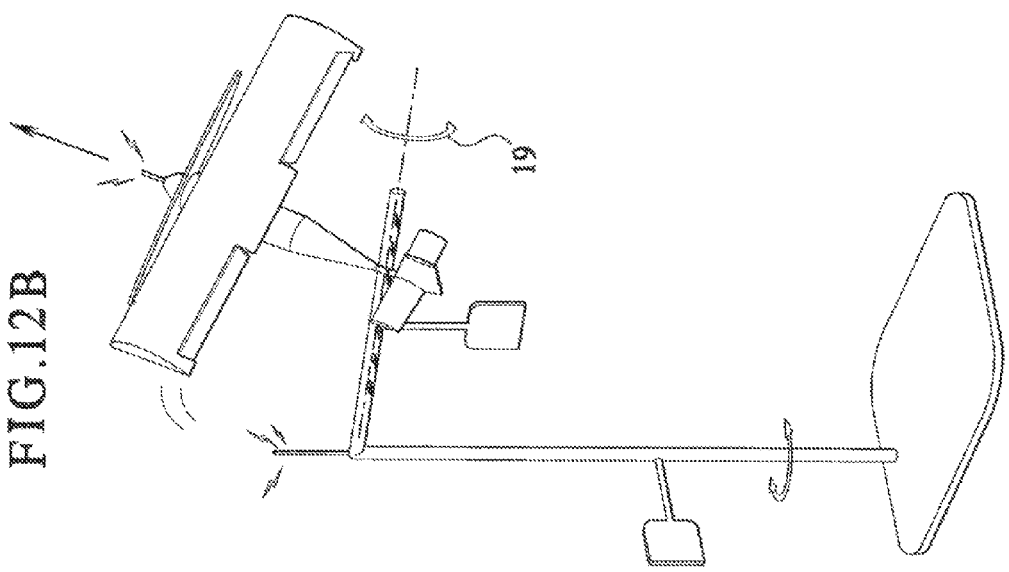
FIGS. 12A, 12B, 12C, and 12D are a series of diagrammatic rear-quarter perspective views of an embodiment of the present disclosure for a hovering aircraft, showing the aircraft sequentially approaching, engaging, and hanging from a cantilever retrieval fixture which has a set of latches for engaging a detent in the aircraft fuselage.
Figure 12B:
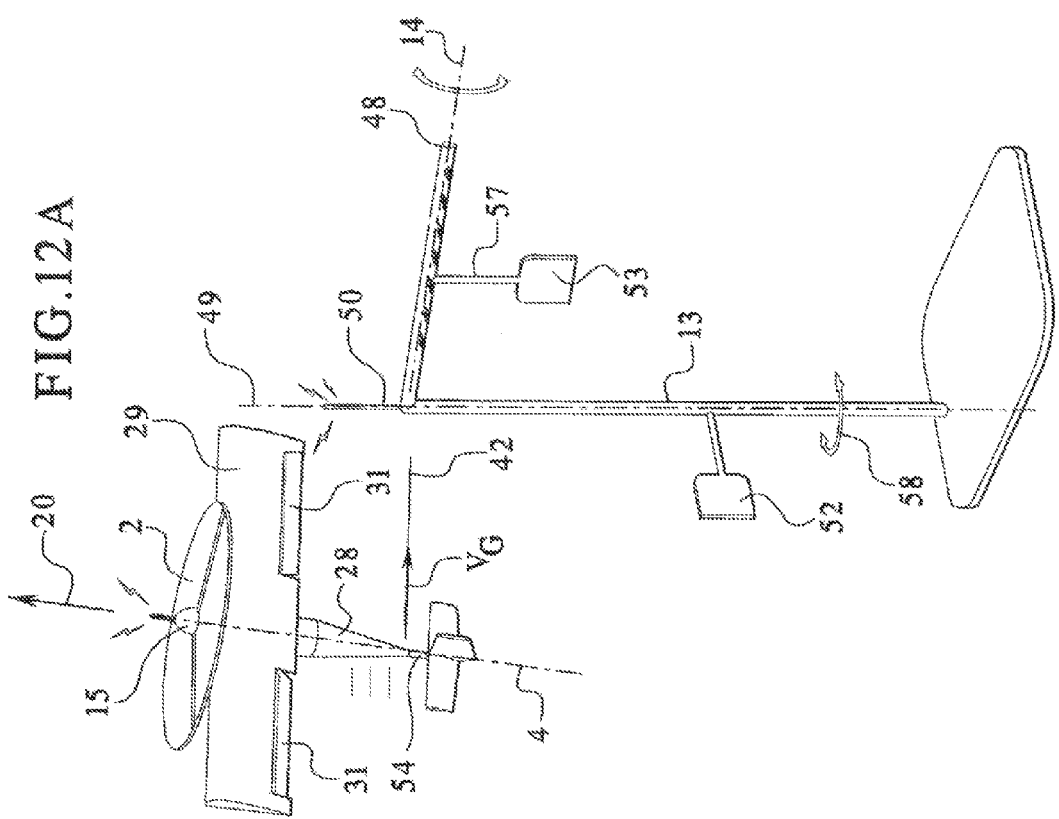
Figure 12D:
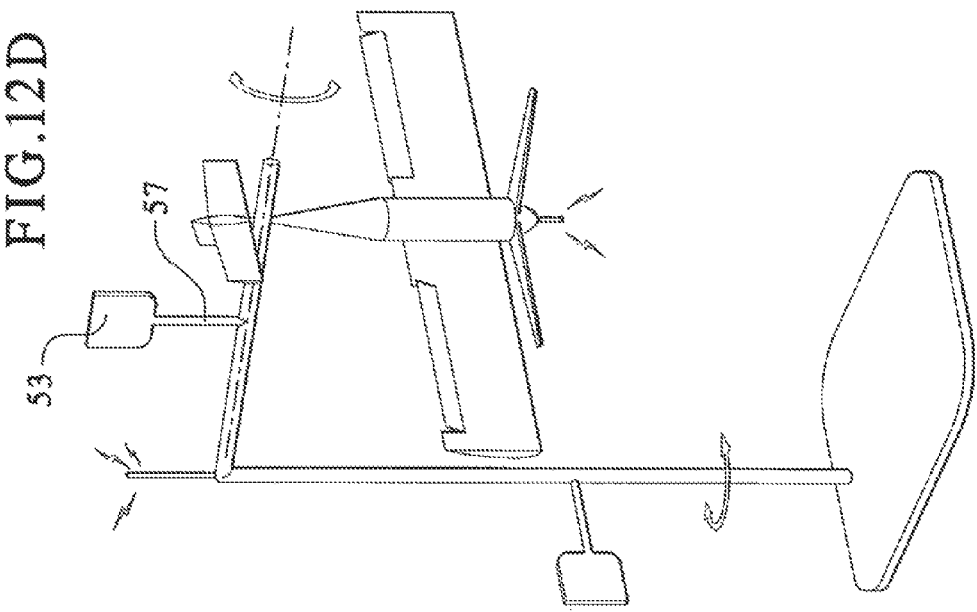
Figure 12C:
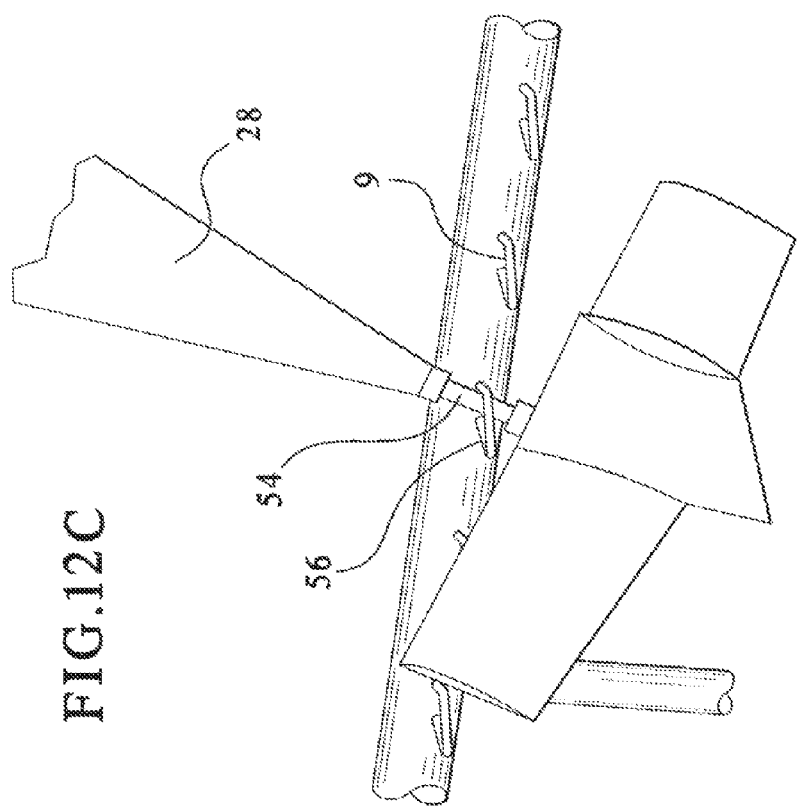

FIGS. 10A, 10B, and 10C show an embodiment of the present disclosure in which the retrieval fixture is a boom 48 cantilevered from a mast 13. A large aperture for capturing the retrieval fixture is created by trailing an interceptor having a string 44 with a grappling hook 9, or alternatively with a small trailing mass 43 as shown in FIGS. 11A, 11B, 11C, and 11D. Contact may excite waves in the trailing string and so make sliding over the boom 48 intermittent. Steady sliding can be promoted by including a string tail 45 below the hook 9 or trailing mass 43. Sliding of the string 44 along the boom 48 leads to capture by the grappling hook 9, or, alternatively, if the string 44 contacts the boom 48 at sufficient speed $V_G$, then the inertia of the trailing mass 43 will cause the string 44 to wrap around the boom 48. The aircraft comes to rest hanging by the string 44. The longer the string 44, the larger the aperture for capture, and so the more relaxed are requirements for accuracy in approach. However, this advantage is balanced by the need to elevate the cable boom 48 to allow sufficient room for the aircraft to hang on the string. In one embodiment, the necessary clearance could be reduced by retracting the string 44 after capture. This embodiment would require a suitable retraction mechanism.

FIGS. 11A, 11B, 11C, and 11D show an alternative embodiment in which the aircraft 28 need not have a hook. Instead, the retrieval fixture includes a boom 48 to which multiple cleats 24 are attached. The aircraft 28 trails an interceptor including a string 44 with a mass 43 and a tail 45. The axis 14 of the boom 48 includes a component parallel to the aircraft's direction of approach 42. Consequently, as the aircraft 28 draws the string 44 across the boom 48, the string slides along the boom into a cleat 24, which in one embodiment captures the string as discussed in connection with FIG. 3. Retrieval is completed as discussed in connection with FIGS. 10A, 10B, and 10C.

FIGS. 12A, 12B, 12C, and 12D show another embodiment in which one of a set of latches 56 on a cantilever boom 48 engages one or more detents 54 in the aircraft 28. The aircraft 28 approaches on a path 42 controlled so that a detent 54 is directed into a latch 56 on the boom 48. Retrieval is completed as discussed in connection with FIGS. 10A, 10B, and 10C.

In the embodiment of FIGS. 12A, 12B, 12C, and 12D, the cantilever boom 48 is rotatable on a hinge 50 about a vertical axis 49 as shown by arrow 58. An aerodynamic surface 52 orients the boom 48 passively relative to the wind. Similarly, the boom 48 is rotatable about a horizontal axis 14, and is rigidly connected to an aerodynamic surface 53. The weight of this surface 53, and its attachment 57 to the boom 48, are chosen so that the latches 56 are oriented appropriately for a horizontal approach in calm wind. The area of the surface 53 is chosen so that as the wind speed increases, the latches orient appropriately for a descending approach as shown in FIG. 8 and FIG. 9.

Figure 13A:
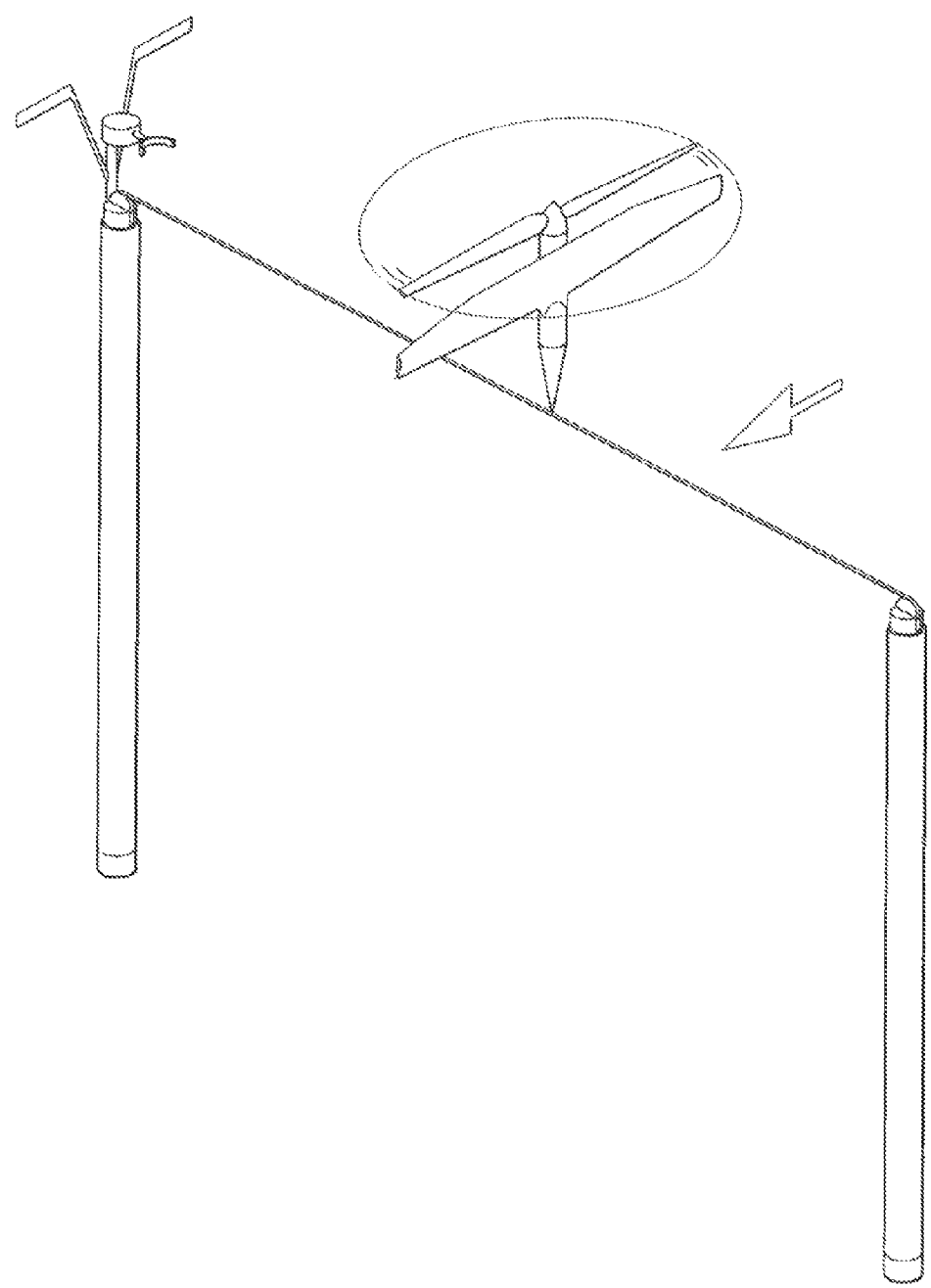
FIGS. 13A, 13B, 13C, and 13D are a series of diagrammatic rear-quarter perspective views of an embodiment of the present disclosure for a hovering aircraft, showing the aircraft sequentially engaging and translating along a retrieval cable into a parking fixture, parking in the fixture, and being stored or released for another flight.
Figure 13B:
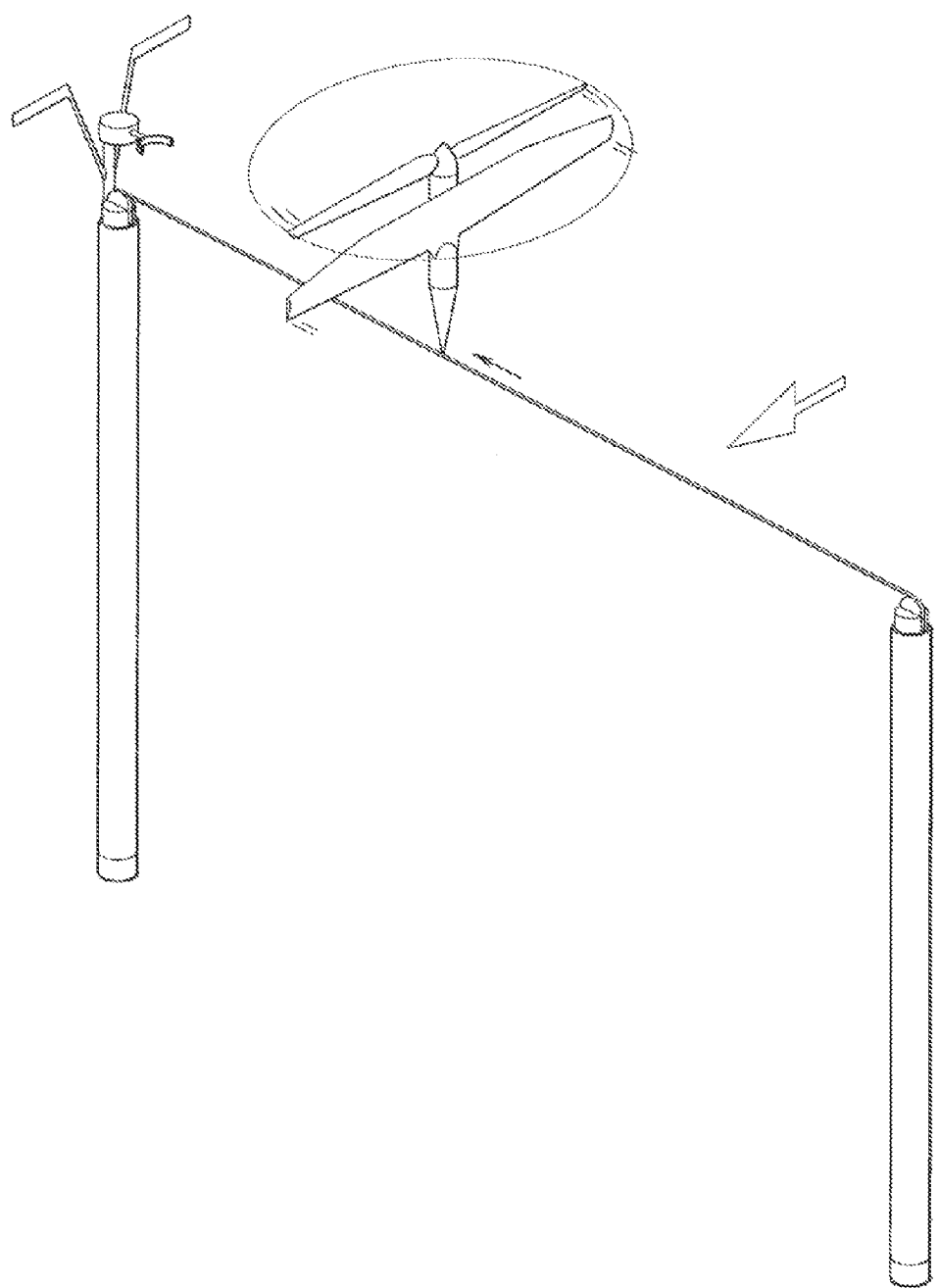
Figure 13C:
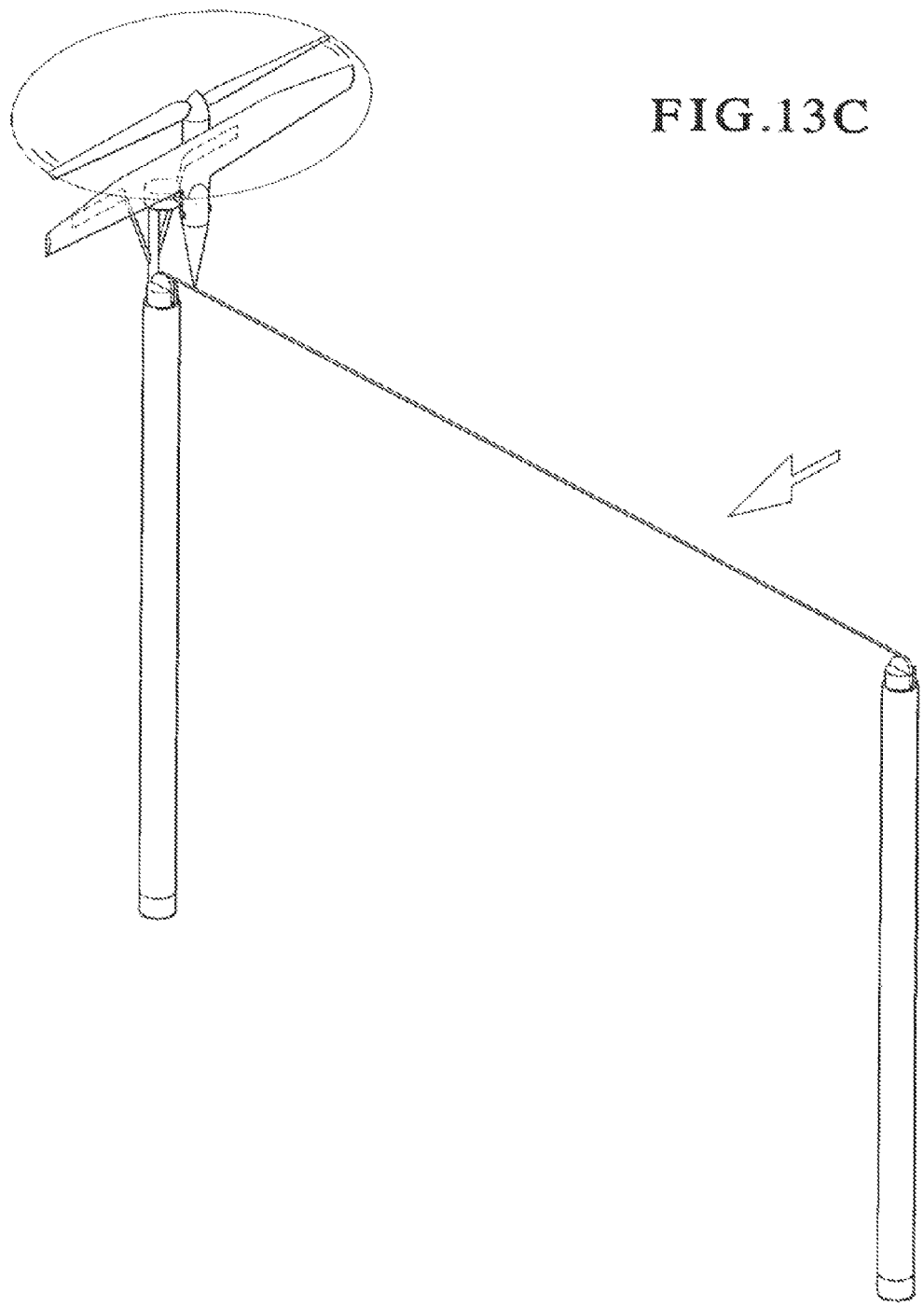
Figure 13D:
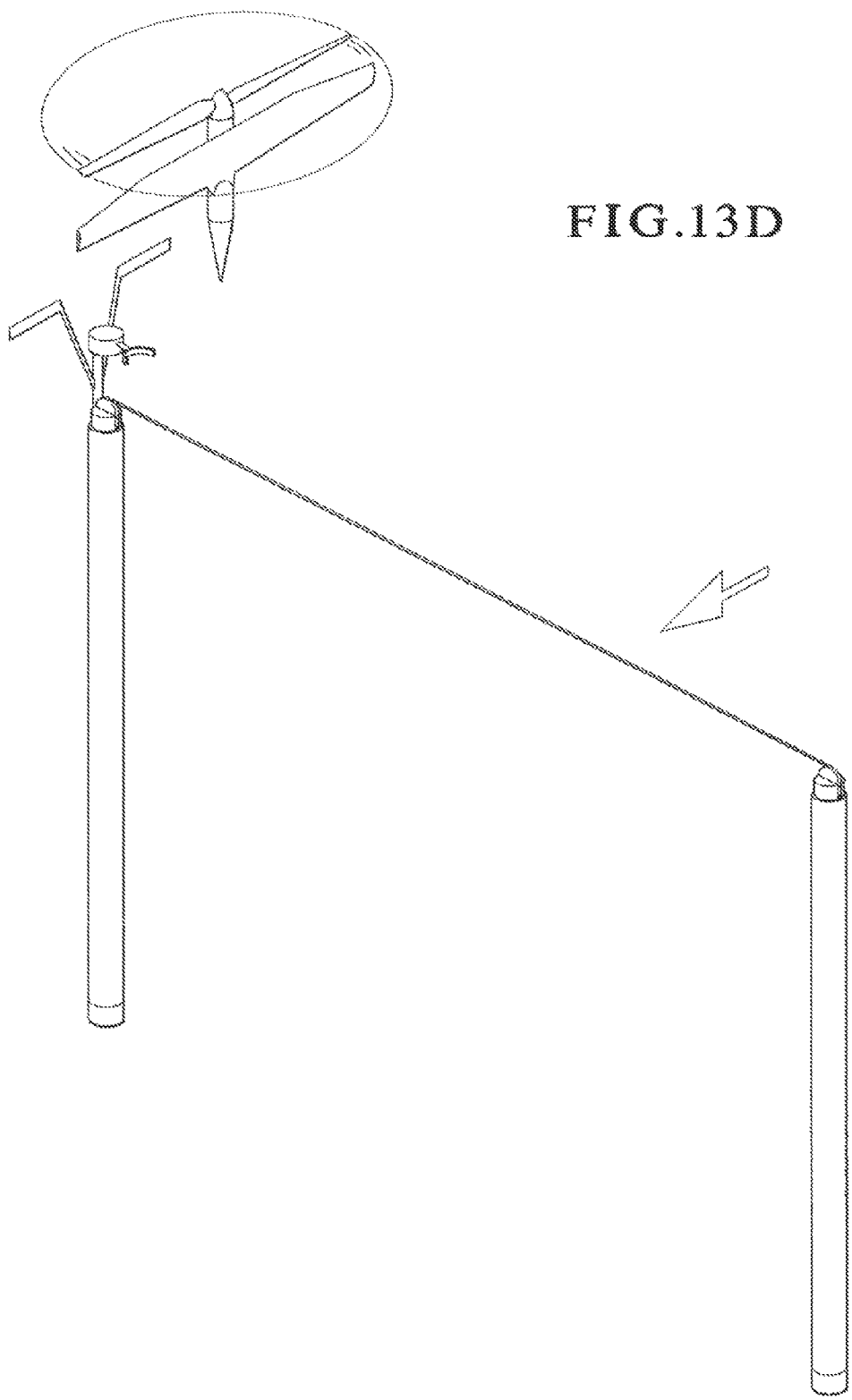

In the embodiments illustrated above, the aircraft's thrust axis rotates substantially out of the vertical during the course of retrieval. FIGS. 13A, 13B, 13C, and 13D show an alternative embodiment in which the thrust axis remains near vertical until the aircraft "parks." The aircraft approaches and captures a retrieval cable 12 as in FIGS. 4A and 4B. Then, upon detecting contact, it applies pitch and yaw torques, for example by appropriate adjustment of rotor cyclic pitch, so that rotation about the cable is arrested and near-vertical orientation is maintained. By further application of control torques, the aircraft slides along the cable such that it is guided by the cable into a docking fixture 5a near a cable support as shown in FIGS. 13B and 13C. The docking fixture may include devices suitable for orienting and securing the aircraft in a desired position, which is provided so that secure docking can be detected, after which the aircraft's motor can be shut down. In one example, the docking fixture includes an arm, such as the arm illustrated in FIGS. 13A, 13B, 13C, and 13D, configured to engage and secure the aircraft. The docking station may further include suitable devices for conveniently servicing the aircraft, stowing the aircraft, or launching the aircraft for another flight as shown in FIG. 13D.

It should be understood that various changes and modifications to our illustrative embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for capturing a flying object, said apparatus comprising:
   (a) a fixture;
   (b) a suspension support configured to suspend the fixture; and
   (c) a docking fixture attached to the suspension support, the docking fixture including an arm configured to engage a portion of the flying object,
   wherein the suspension support is configured to suspend the fixture such that:
      (i) a member connected to a body of the flying object may contact the fixture by motion of the flying object relative to the fixture,
      (ii) the flying object may translate relative to the fixture toward the docking fixture, and
      (iii) the docking fixture receives the flying object.

2. The apparatus of claim 1, wherein the suspension support is configured to suspend the fixture such that the member may contact the fixture such that the member removably attaches to the fixture.

3. The apparatus of claim 1, wherein the docking fixture is configured to enable the flying object to be stowed.

4. The apparatus of claim 1, wherein the docking fixture is configured to enable the flying object to be serviced.

5. The apparatus of claim 4, which is configured to automatically service the flying object.

6. The apparatus of claim 1, wherein the docking fixture is configured to facilitate launch of the flying object.

7. The apparatus of claim 1, wherein the arm is configured to hold said portion of the flying object.

8. The apparatus of claim 1, wherein the docking fixture is configured to guide the flying object into a desired resting position as the flying object translates relative to the fixture toward the docking fixture.

9. The apparatus of claim 8, which is configured to detect that the flying object has been guided into said desired resting position.

10. The apparatus of claim 1, wherein the docking fixture is configured to orient the flying object.

11. An apparatus for capturing a flying object, said apparatus comprising:
    (a) a fixture;
    (b) a suspension support configured to suspend the fixture; and
    (c) a docking fixture attached to the suspension support, the docking fixture including an arm configured to engage a portion of the flying object,
    wherein the suspension support is configured to suspend the fixture such that:
       (i) after a member connected to a body of the flying object contacts and removably attaches to the fixture, the flying object may translate relative to the fixture toward a docking fixture;
       (ii) the docking fixture receives the flying object; and
       (iii) the arm engages the portion of the flying object.

12. The apparatus of claim 11, wherein the docking fixture is configured to enable the flying object to be stowed.

13. The apparatus of claim 11, wherein the docking fixture is configured to enable the flying object to be serviced.

14. The apparatus of claim 13, which is configured to automatically service the flying object.

15. The apparatus of claim 11, wherein the docking fixture is configured to facilitate launch of the flying object.

16. The apparatus of claim 11, wherein the arm is configured to hold said portion of the flying object.

17. The apparatus of claim 11, wherein the docking fixture is configured to guide the flying object into a desired resting position as the flying object translates relative to the fixture toward the docking fixture.

18. The apparatus of claim 17, which is configured to detect that the flying object has been guided into said desired resting position.

19. The apparatus of claim 11, wherein the docking fixture is configured to orient the flying object.

20. An apparatus for capturing a flying object, said apparatus comprising:
    (a) a fixture;
    (b) a suspension support configured to suspend the fixture; and
    (c) a docking fixture attached to the suspension support, the docking fixture including an arm configured to engage a portion of the flying object, wherein the suspension support is configured to suspend the fixture such that:
  (i) the docking fixture receives the flying object after:
    (A) a member connected to a body of the flying object contacts the fixture by motion of the flying object relative to the fixture;
    (B) the member removably attaches to the fixture; and
    (C) the flying object is translated relative to the fixture toward the docking fixture; and
  (ii) the arm engages said portion of the flying object.

21. The apparatus of claim 20, wherein the docking fixture is configured to enable the flying object to be stowed.

22. The apparatus of claim 20, wherein the docking fixture is configured to enable the flying object to be serviced.

23. The apparatus of claim 22, which is configured to automatically service the flying object.

24. The apparatus of claim 20, wherein the docking fixture is configured to facilitate launch of the flying object.

25. The apparatus of claim 20, wherein the arm is configured to hold said portion of the flying object.

26. The apparatus of claim 20, wherein the docking fixture is configured to guide the flying object into a desired resting position as the flying object translates relative to the fixture toward the docking fixture.

27. The apparatus of claim 26, which is configured to detect that the flying object has been guided into said desired resting position.

28. The apparatus of claim 22, wherein the docking fixture is configured to orient the flying object.

\* \* \* \* \*